(12) United States Patent
Dogru

(10) Patent No.: US 9,104,585 B2
(45) Date of Patent: Aug. 11, 2015

(54) COUPLED PIPE NETWORK—RESERVOIR MODELING FOR MULTI-BRANCH OIL WELLS

(71) Applicant: Saudi Arabian Oil Company, Dhahran (SA)

(72) Inventor: Ali Haydar Dogru, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 450 days.

(21) Appl. No.: 13/682,896

(22) Filed: Nov. 21, 2012

(65) Prior Publication Data
US 2013/0132049 A1  May 23, 2013

Related U.S. Application Data

(60) Provisional application No. 61/562,680, filed on Nov. 22, 2011.

(51) Int. Cl.
*G06F 17/10* (2006.01)
*E21B 43/00* (2006.01)
*E21B 41/00* (2006.01)
*G01V 99/00* (2009.01)

(52) U.S. Cl.
CPC ............ *G06F 17/10* (2013.01); *E21B 41/0035* (2013.01); *E21B 43/00* (2013.01); *G01V 99/005* (2013.01)

(58) Field of Classification Search
CPC .. G06F 17/10; G06F 17/5018; G06F 17/5086; G06F 17/5009; G06F 2217/16; E21B 49/00; E21B 41/0035; G01V 99/005
See application file for complete search history.

(56) References Cited

U.S. PATENT DOCUMENTS

| | | | |
|---|---|---|---|
| 7,526,418 B2* | 4/2009 | Pita et al. ......................... | 703/10 |
| 8,195,401 B2* | 6/2012 | Ella et al. ......................... | 702/13 |
| 2010/0114544 A1* | 5/2010 | Dogru ............................. | 703/10 |
| 2011/0320177 A1* | 12/2011 | Bowen et al. ..................... | 703/2 |

OTHER PUBLICATIONS

Dogru et al, "A Next-Generation Parallel Reservoir Simulator for Giant Reservoirs", SPE 119272, 2009.*

(Continued)

*Primary Examiner* — Mary C Jacob
(74) *Attorney, Agent, or Firm* — Bracewell & Giuliani LLP; Constance G. Rhebergen; Albert B. Kimball, Jr.

(57) ABSTRACT

A convergent solution is provided for a coupled system where oil flow from a subsurface reservoir formation enters a number of pipes of a multi-branch well in the formation. An iterative linear system solver computer implemented methodology is developed, capable of handling a large number of unknowns which are present when modeling a multi-branch well. A systematic approach which defines proper boundary conditions at the reservoir level and at the wellhead is provided and utilized.

15 Claims, 12 Drawing Sheets

(56) References Cited

OTHER PUBLICATIONS

Hepguler et al, "Integration of a Field Surface and Production Network with a Reservoir Simulator", SPE 38937, 1997.*
Coats et al, "A Generalized Wellbore and Surface Facility Model, Fully Coupled to a Reservoir Simulator", SPE 87913, 2004.*
Livtak et al, "Simplified Phase-Equilibrium Calculations in Integrated Reservoir and Surface-Pipeline-Network Models", SPE 64498, 2000.*

International Search Report and Written Opinion issued in related International Patent Application No. PCT/US2012/066298; dated Sep. 2, 2013; 9 pages.

V.J. Zapata et al., "Advances in Tightly Coupled Reservoir/Wellbore/Surface Network Simulator", SPE Reservoir Evaluation and Engineering Journal, vol. 4, No. 2, Apr. 2001, pp. 114-120, XP002705648.

* cited by examiner

COUPLED PIPE NETWORK—RESERVOIR MODELING FOR MULTI-BRANCH OIL WELLS

CROSS REFERENCE TO RELATED APPLICATIONS

This application claims priority from U.S. Provisional Application No. 61/562,680, filed Nov. 22, 2011. For purposes of United States patent practice, this application incorporates the contents of the Provisional Application by reference in entirety.

BACKGROUND OF THE INVENTION

1. Field of the Invention

The present invention relates to modeling of pipe networks in subsurface reservoirs, and more particularly to modeling the flow in a reservoir formation having multilateral or multi-branch wells.

2. Description of the Related Art

Multi-branch or multilateral wells (also known as Maximum Reservoir Contact or MRC wells) with several pipes formed off a main or mother bore in a formation in a reservoir formation have increasingly been used in oil reservoirs to produce oil, and to prevent water and gas coning. Designing an MRC well requires a reservoir simulator with a pipe flow option to characterize flow from the reservoir through the pipes of the well. Simulators handling pipe flow have faced many problems. These arose from the distinct flow characteristics of two different media: the porous media (reservoir) and the pipe.

Reservoirs are porous rocks where flow is slow, a few centimeters a day, whereas flow inside the pipe in a well is in comparison very fast, i.e. on the order of a meter per second. There is also strong interaction between the reservoir and the well. The reservoir discharges fluid into the well through perforations along the branches which are on the order of hundreds or thousands of feet in length. Once the fluid enters into the pipe, the fluid moves very quickly in comparison with reservoir flow towards a well location known as a hip of the well where the entire production is collected.

Pressure and flow rate distribution inside the well are very sensitive to several variables: the contribution from reservoir, pressure differences inside the well and the production rate. A fraction of a psi pressure drop in the pipe can cause flow of very large volumes of fluid. Therefore, under these conditions it has generally been difficult to develop a stable pressure distribution inside the pipe in the reservoir for modeling purposes.

Because of the inherent difficulties in solving for flow in both media (reservoir and well) together, reservoir simulators have preferred a decoupled approach. A well pressure distribution was assumed, and used to generate models of influx into the wellbore, and then the models solved for the new well bore pressures. The new well pressures were used as boundary conditions for the reservoir simulator to calculate new influx into the wellbore. The process was continued until the influx values from the reservoir, the well pressures and the reservoir variables did not change. This type of processing has been called sequential algorithms. It was well known that sequential algorithms have time step size limitations for time dependent problems. Despite these limitations, sequential (decoupled) methods have often been used in simulators in the petroleum industry because of their perceived convenience.

A further problem has been that fully coupled solutions were expensive in terms of computation time and usage, and often faced convergence problems due to ill conditioned pipe flow matrices in the model.

Since the pipe flow equations produced ill-conditioned matrices, linearized solutions with techniques such as Newton Raphson iterations would not converge unless a good estimate of the actual solution is given. It was not easy to give such an estimate for complex networks with strong influx from the reservoir.

SUMMARY OF THE INVENTION

Briefly, the present invention provides a new and improved computer implemented method of forming a model of fluid flow in a multilateral well in which fluid from a subsurface reservoir enters perforations in a plurality of pipes off a main bore of the well. The model is based on data measurements regarding the fluid, well and reservoir. According to the method, an initial measure of transmissibility of the pipes is determined based on the pipes having fluid flow characteristics of a porous media. A linear model of postulated well potentials (or datum corrected pressure as defined in the nomenclature) at perforations in the pipes is formed based on the initial measure of transmissibility. A measure of well potential at the perforations in the pipes is determined by computer processing to solve the linear model. The determined measures of well potential at the perforations in the wells are tested for satisfactory convergence within a specified limit of accuracy. If convergence is not achieved, the postulated well potentials of the linear models are adjusted, and the steps of determining and testing measures of well potential are repeated. If convergence is achieved, well pressures for the pipes of the multilateral well are determined.

The present invention also provides a new and improved data processing system which forms a model of fluid flow in a multilateral well in which fluid from a subsurface reservoir enters perforations in a plurality of pipes off a main bore of the well. The model is based on data measurements regarding the fluid, well and reservoir. The data processing system includes a processor which determines an initial measure of transmissibility of the pipes based on the pipes having fluid flow characteristics of a porous media, and forms a linear model of postulated well potentials at perforations in the pipes based on the initial measure of transmissibility. The processor also determines a measure of well potential at the perforations in the pipes to solve the linear model. The processor tests the determined measures of well potential at the perforations in the wells for satisfactory convergence within a specified limit of accuracy. If convergence is not achieved, the processor adjusts the postulated well potentials of the linear models and repeats the steps of determining and testing measures of well potential. If convergence is achieved, the processor determines well pressures for the pipes of the multilateral well; and a memory of the data processing system forms a record of the determined well pressures for the pipes of the multilateral well.

The present invention also provides a new and improved data storage device which has stored in a computer readable medium, computer operable instructions for causing a data processor to form a model of fluid flow in a multilateral well in which fluid from a subsurface reservoir enters perforations in a plurality of pipes off a main bore of the well. The model is based on data measurements regarding the fluid, well and reservoir. The instructions stored in the data storage device cause the data processor to determine an initial measure of transmissibility of the pipes based on the pipes having fluid flow characteristics of a porous media, and form a linear model of postulated well potentials at perforations in the pipes based on the initial measure of transmissibility. The instructions also cause the processor to determine a measure of well potential at the perforations in the pipes by solving the linear model. The instructions also cause the processor to test the determined measures of well potential at the perforations in the wells for satisfactory convergence within a specified limit of accuracy. If convergence is not achieved, the instructions cause the processor to adjust the postulated well potentials of the linear models, and repeat the determining and testing of measures of well potential. If convergence is achieved, the instructions cause the processor to determine well pressures for the pipes of the multilateral well.

BRIEF DESCRIPTION OF THE DRAWINGS

FIG. 9 is a schematic diagram of structure of a coefficient matrix for a multilateral well according to the present invention.

FIG. 12 is a schematic diagram of structure of a preconditioning matrix for a multilateral well according to the present invention.

DETAILED DESCRIPTION OF THE PREFERRED EMBODIMENTS

With the present invention, a new and improved data processing system and methodology is provided for solving coupled pipe and reservoir flow problem for MRC wells with a number of branches.

According to the present invention, flow in MRC wells is treated as two dimensional (x-y) steady flow for modeling. A new numbering scheme or protocol is provided for the pipe segments of the wells which serve as computational elements in the computer processing. This is done to provide nearly tridiagonal coefficient matrices for processing.

An approximate but satisfactorily close initial solution for the well pressures and flow rates has been developed according to the present invention in which the MRC pipe network is treated like a porous media. The equivalent transmissibility of the porous media is determined by equating the pipe flow to porous media flow. Transmissibility determined in this way is several orders of magnitude greater than transmissibility of a fractured rock. Since the flow equations in porous media are linear, the resulting flow equations are solved with no iterations for the initial distribution of the unknowns (pressures). This solution reflects the pressure variation inside the pipe due to influx from reservoir and due to production at the well head.

The nonlinear equations expressing the well pressure and flow rate relationships are linearized to obtain a linear system of equations. Two residual forms are used: natural and squared norm. Iterations are solved by the Newton-Raphson method. A new linear iterative solver methodology is also provided according to the present invention. The linear iterative solver methodology follows the numbering protocol or convention for the pipe segments and takes advantage of the near tridiagonal structure of the coefficient matrix. The methodology requires minimal storage, and is very fast comparing to direct solvers which are often used for small number of unknowns.

Figure 1:
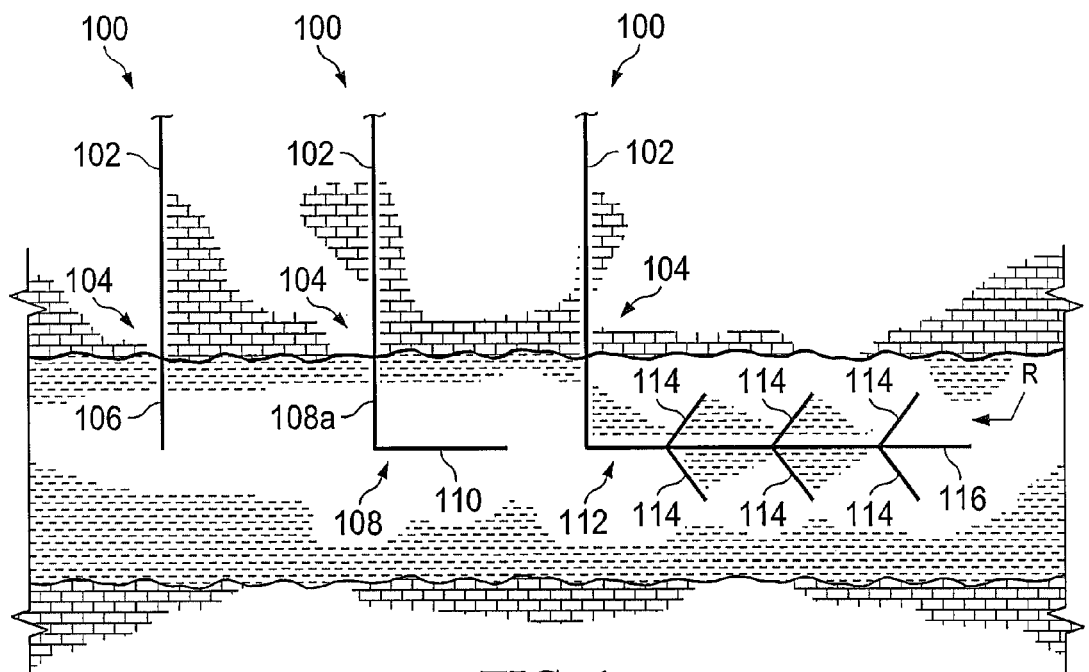
FIG. 1 is a schematic diagram of various types of wells in a subsurface reservoir.
Figure 2:
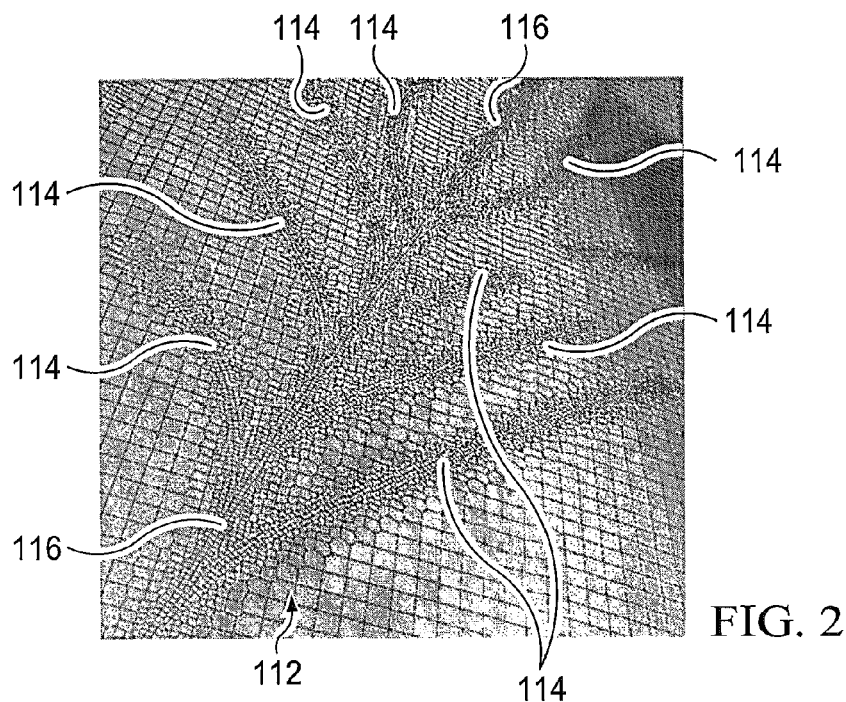
FIG. 2 is a display of a multilateral well from a computerized reservoir simulator model.

Oil from underground reservoirs is produced through the wells drilled into the reservoirs, such as that indicated schematically at R (FIG. 1). Wells are completed by using steel pipes extending from the reservoir R to surface. A typical oil well 100 (FIG. 1) has two main parts, a vertical section 102 extending downwardly from a well head at the earth surface to the reservoir R and a well section 104 inside the reservoir R. The well section 104 inside the reservoir R can be of several types as shown in FIG. 1, including: a vertical well 106 having generally vertically extending sections both in the reservoir R and extending to the surface through earth formations above the reservoir; a horizontal well 108 having a vertical section 108a from the surface into the reservoir with a generally laterally or horizontally extending well bore 110; or a multilateral well 112 (also termed a fish bone well or Maximum Reservoir Contact (MRC) well) with several branch pipes 114 formed extending into the reservoir R off a main or mother bore 116 in the reservoir R. FIG. 2 is a display of a typical reservoir simulation grid showing the MRC well 112 with branch pipes 114 and mother bore 116.

For a specified well production rate at the well head, it has been a problem to determine a production profile along the branches such as those indicated at 114 under varying influx from the reservoir R. Well branches can be hundreds to thousands of feet long. To predict the performance of the well, a flow profile along the branches need to be determined properly.

These determinations are not simple. There is strong interaction between the well and surrounding reservoir. Many factors play a significant role. For example, pipe diameter, perforation frequency or spacing, pipe lengths, reservoir heterogeneity and reservoir pressure are important factors to be accounted for.

The most common approach, so far as is known, has been to use a reservoir simulator. Most of the reservoir simulators do not include hydraulic calculations and friction pressure drop inside the pipe. Instead, perforation flow rates are assigned in proportion of the perforation productivity index to the total well productivity index. See, for example, pp. 321-322, Aziz, K and Settari, A; *Petroleum Reservoir Simulation*, Applied Science Publishers LTD, 1979

Including calculations for well hydraulics in the pipe increases the computer time for a simulator. Generally solving both reservoir equations and pipe flow equations simultaneously has proven very difficult. This approach reduces the time step size for the simulator, increases computational cost and often creates numerical convergence problems. This is again due to complex processing used in handling such a difficult coupling problem.

Because of these difficulties, many simulators have preferred the sequential calculation approach: first compute the reservoir unknowns, then solve for the pipe unknowns (pressures and flow rates). The sequence of computations is repeated until convergence is achieved. Such an approach is expensive and generally requires small time steps. However, it is the preferred approach used by most of the simulators in the industry. An example is Zapata et al; *advances in Tightly Coupled Reservoir/Wellbore/Surface Network Simulator, SPE reservoir Evaluation and Engineering Journal*, Vol. 4, No2, pp: 114-120, April 2001, which presents coupling a reservoir simulator with the well bore and the surface network.

With the present invention, the difficulty of the coupled reservoir pipe flow problem has been analyzed and a convergent and stable data processing methodology provided.

There are several problems. As has been discussed above, the fluid flow characteristics for the two media are entirely different: slow flow in reservoir, fast flow in the pipe. Also in a typical MRC well branches produce different amounts of oil.

Branches closer to the hip of the well get more production from the reservoir. The branches away from the hip get less production. The production profile also changes along each branch. While the perforations close to the mother bore get more production, perforations away from the mother bore (junction) get less influx from the reservoir and thus produce less. Therefore in general, obtaining a correct production profile for each MRC branch is a substantial problem. This problem becomes more pronounced with varying pipe dimensions.

Many complexities can occur during the production from an MRC well. As an example, for selected pipe diameters and length for a complex (MRC) well shown at a given production rate, it is possible that while some perforations produce oil from the reservoir into the wellbore the other perforations inject oil into the reservoir. This is called back flow or flow reversal, and is not a desirable phenomenon.

Back flow is caused by reservoir heterogeneities, reservoir pressure distribution and incorrectly selected pipe dimensions and lengths. In order to prevent back flow, MRC wells need to be designed properly by taking into account reservoir heterogeneity, pipe dimensions and length. Simulation of back flow requires coupled reservoir-pipe network solution.

In general hydraulics calculations in the pipe with added flux from the reservoir complicate the numerical solution. The two flow media which are the pipe and the reservoir are completely different. The porous media of the reservoir formation has microscopic space where the flow takes place, whereas the pipe in the well has a large open volume for the flow. Therefore, a main difficulty in hydraulics calculations for coupled reservoir and pipe flow has been how to get a convergent numerical solution with proper boundary conditions for the coupled system. In this context, the term coupling is used in the sense that the reservoir keeps dumping oil into the pipe where oil is flowing.

Interaction between the reservoir and pipe is generally very strong. Due to the nature of the pipe flow, the hydraulic equations are highly nonlinear. When linearized, the equations of the resulting linear system are ill-conditioned. Therefore, obtaining a reasonable solution for the pipe flow has been a difficult problem.

Such a complex problem requires proper boundary conditions to produce a unique solution. Based on the physics of the problem it is noted that the problem has two boundary conditions: one at the reservoir level (reservoir pressure) and one at the well head, flow rate or the operating pressure. Utilizing these boundary conditions, fixed pressure (according to the Dirichlet boundary condition) and fixed rate (according to the Neumann boundary condition) assures that the differential equations describing the flow from the reservoir into pipe and flow inside the pipe have a unique solution.

Next, the condition of the system has been analyzed to come up with a solution algorithm. Analysis has shown that system of equations yields ill-conditioned linear systems. Therefore, with the present invention, a close estimate of initial conditions such as distribution of the wellbore pressures inside the multi branch (MRC) well was found to be desirable. The present invention has found that it is possible to determine a pressure distribution within the well which shows pressure variations similar to the actual solution.

This has been accomplished by defining equivalent porous media problem from the pipe flow. Next, the nonlinear pipe flow equations with the flow contribution from the reservoir are solved by Newton Raphson method with iteration. It is shown that defining a square norm for the residuals equations yield smoother and better convergence.

In solving the linear system for the initial guess and linearized system of equations for the pipe and reservoir influx, algorithm introduces a new numbering scheme which reduces a two dimensional flow into nearly one dimensional flow (near tridiagonal matrices). The iterative linear solver developed uses the new numbering scheme developed for solving the linear. The new iterative solver requires very little storage and can handle as many unknowns. It is very fast. The maximum number of unknowns is determined by the memory of the computer used.

In accordance with the present invention, an analytical formulation with proper boundary conditions is provided for a coupled model of multilateral well flow. As an example of the difficulties faced before the present invention, it is illustrative to consider a situation where influx from the reservoir is unknown, as well as the well pressure distribution.

Assume that a well is producing at a constant rate. The fluid is a single phase (mixture) with homogeneous properties. The fluid properties such as viscosity and density can be considered constant or dependent on pressure. Flow is assumed at steady state.

Reservoir pressure (potential) is assumed to be known around the well. This could be the used as the reservoir pressure at every Newton iteration of a simulator. The reservoir potential can vary from point to point in the reservoir; however, for the present invention, it is assumed reservoir potential is constant. Reservoir fluid is delivered into the branches of the MRC well through perforations in the well pipe segments.

Production from the well head creates flow distribution along the well branches. Influx from reservoir into the well pipe is caused by the difference between the reservoir pressure at that perforation and the pressure inside the pipe. Additionally the flow rate is controlled by the Productivity Index (PI) at that perforation, i.e. the higher the PI, the higher the influx at a nominal pressure drop. The PI factors also depend on the reservoir permeability, i.e. the higher the rock permeability, the higher the PI or vice versa.

Nomenclature

Set forth below for ease of reference and understanding is a listing of the nomenclature used in the Equations which represent the various parameters and measurements used in data processing steps and analysis according to the present invention.

$q_{i,j}$=flowrate from node i to j barrels/day, b/d
d=pipe diameter, ft
E=Pipe efficiency, dimensionless ($0 \leq E \leq 1$)
$\Phi$=Fluid Potential (=P+$\rho$g (reservoir depth−z), psi, where P=pressure, $\rho$=fluid density, z=vertical from datum dept)
$\gamma$=Fluid Specific Gravity, dimensionless ($0 \leq \gamma \leq 1$)
$\Delta\Phi = \Phi_i - \Phi_j$, Potential difference between element j, and element i along the pipe, psi
$\Delta\bar{x}$=Average distance between point j and point i along the pipe, ft
z=depth of the pipe element from surface, ft
$r_w$=pipe radius, ft Boundary Conditions To summarize, there are two main boundary conditions:
(1) Well Production rate q is specified at the well head or at the bottom hole; and
(2) Reservoir Pressure (or datum corrected pressure called potential) is known around each perforation, $\Phi_R$ The relationship for the inflow from reservoir into well bore is given by $$q_i = PI_i(\Phi_R - \Phi_{wi}) \tag{1a}$$

where $q_i$ is the flow rate between reservoir and pipe, at perforation i; $PI_i$ is the rock productivity index for the same perforation, $\Phi_R$ is the reservoir potential (datum corrected pressure) and $\Phi_{wi}$ is the well potential inside the pipe at perforation i.

Rock productivity index $PI_i$ is defined by $$PI_i = \frac{2\pi k \Delta x}{\ln(0.2\Delta x)} \tag{1aa}$$

where k is the rock permeability, $\Delta x$ is the length of the formation exposed to flow (in finite difference simulators it is the length of the grid block).

Figure 4:
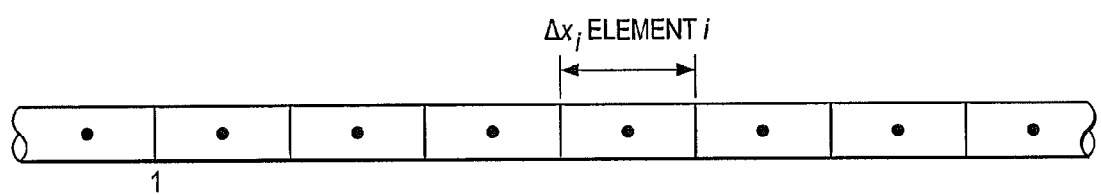
FIG. 4 is a schematic diagram of spatial distribution of the physical domain of a pipe element in a multilateral well.
Figure 5:
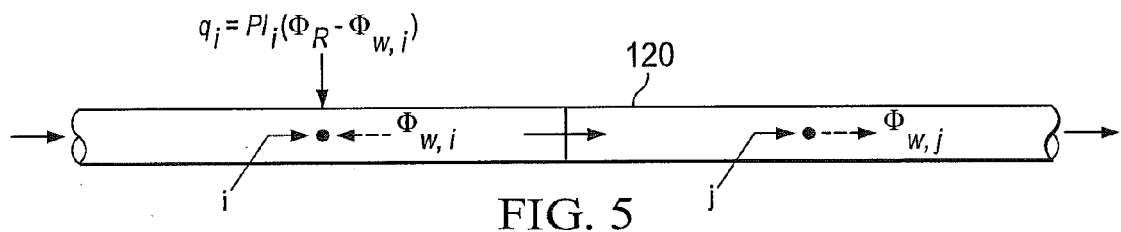
FIG. 5 is a schematic diagram of flow from a subsurface reservoir into a pipe element.

The objective is to find the flow rate distribution in each branch of the pipe. To solve the problem numerically with the boundary conditions it is necessary to discretize the physical domain (MRC Well). First, the pipe is divided into N segments (elements) $\Delta x_i$ for element i, as shown schematically in FIG. 4. With reference to FIG. 5, the flow between two segments or points i and j is given by:

$$q_{i,j} = \frac{C_1}{\sqrt{f(q_{i,j})}} \sqrt{\Phi_{w_i} - \Phi_{w_j}} \tag{1b}$$

The variables are defined in the Nomenclature set forth above.

Equation (1b) is derived from Bernoulli's equation. With reference to a pipe segment 120 in FIG. 5, the total head h along the pipe is given by Bernoulli's equation.

$$h = z(x) + \frac{P(x)}{\rho g} + \frac{V(x)^2}{2g} \tag{2a}$$

For viscous fluids, energy loss due to viscous forces must be added to the head loss:

$$h = z + \frac{p}{\rho g} + \frac{V^2}{2g} + \int_{x_1}^{x_2} \frac{f}{D} \frac{V(x)^2}{2g} dx \tag{2b}$$

Applying Equation (2a) between point 1 and 2:

$$h = z_1 + \frac{P_1}{\rho g} + \frac{V^2}{2g} + \int_{x_1}^{x_2} \frac{f}{D} \frac{V^2(x)}{2g} dx \tag{2c}$$

$$= z_2 + \frac{P_2}{\rho g} + \frac{V^2}{2g} + \int_{x_1}^{x_2} \frac{f}{D} \frac{V^2(x)}{2g} dx$$

$$z_1 + \frac{P_1}{\rho g} + \frac{V^2}{2g} + 0 = z_2 + \frac{P_2}{\rho g} + \frac{V^2}{2g} + \frac{f}{D} \frac{V^2}{2g} \Delta x \tag{2d}$$

$$z_1 - z_2 + \frac{P_1}{\rho g} - \frac{P_2}{\rho g} = \frac{f}{D} \frac{V^2}{2g} \Delta x \tag{2e}$$

This can be rearranged;

$$\left(z_1 + \frac{P_1}{\rho g}\right) - \left(\frac{P_2}{\rho g} + z_2\right) = \frac{f}{D} \frac{V^2}{2g} \Delta x \tag{2f}$$

Multiplying each side by $\rho g$:

$$(\rho g z_1 + P_1) - (\rho g z_2 + P_2) = \frac{f}{D} \frac{V^2}{2} \Delta x \rho \tag{2g}$$

rearranging $$\frac{2D}{\rho f} \left[ \frac{(\rho g z_1 + P_1) - (\rho g z_2 + P_2)}{\Delta x} \right] = V^2$$

$$V = \frac{\sqrt{2}}{\sqrt{\rho}} \frac{D^{1/2}}{\sqrt{f}} \sqrt{\frac{(\rho g z_1 + P_1) - (\rho g z_2 + P_2)}{\Delta x}} \tag{2h}$$

Since:

$$V = \frac{q}{\pi r_w^2} \tag{2i}$$

$$q = \frac{\pi r_w^2 \sqrt{2}}{\sqrt{\rho}} \frac{D^{1/2}}{\sqrt{f}} \sqrt{\frac{(P_1 + \rho g z_1) - (P_2 + \rho g z_2)}{\Delta x}} \tag{2j}$$

Using practical oil field units, adding an efficiency (calibration) factor, and converting the fluid density $\rho$ to specific gravity $\gamma$, Equation (2j) becomes:

$$q = \frac{295.5 d^{2.5} E}{\sqrt{\gamma} \sqrt{f}} \sqrt{\frac{\Delta \Phi}{\Delta x}} \tag{2k}$$

Flow Balance

Figure 6:
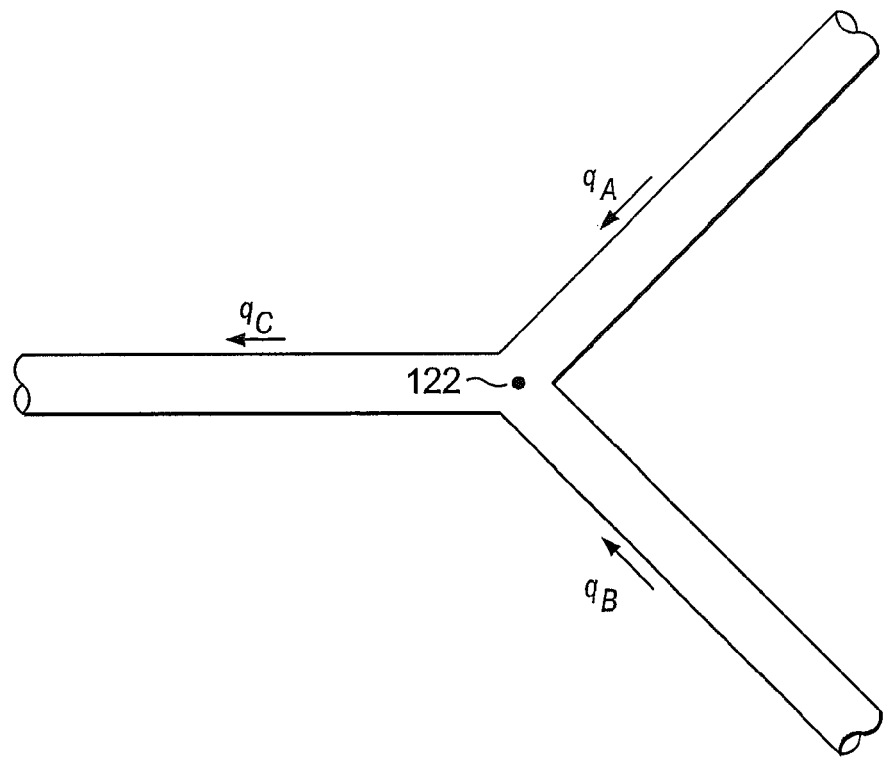
FIG. 6 is a schematic diagram of flow at a typical pipe junction is a subsurface reservoir.

FIG. 6 illustrates a typical pipe junction 122. Summation of flow into the junction 122 is equal to summation of the flow out of junction as shown in FIG. 6. In equation form:

$$q_C = q_A + q_B \quad (3)$$

Figure 7:
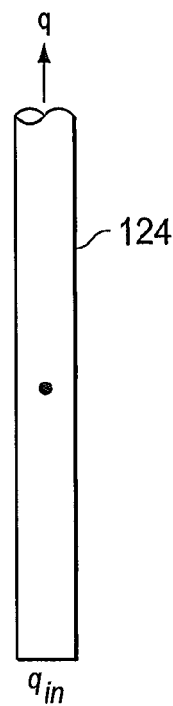
FIG. 7 is a schematic diagram of flow and boundary conditions at well head.

FIG. 7 illustrates flow and boundary condition at the well head 124. The steady state flow boundary conditions at the well head 124 is given by $$q_{in} - q = 0 \quad (4)$$

The flow balance equations between each pipe segment and junctions are then used to form a set of non-linear coupled equations in unknown well potentials.

These equations can be summarized by the following Equation set (5):

$$\sum_{j=1}^{j_n(i)} q_{i,j}(\Phi_{w,i}) + PI_i(\Phi_R - \Phi_{W,i}) - \delta(i)q = 0 \quad (5)$$

The $\delta(i)$ in Equation (5) is the Dirac's delta function which equals 1 if the element i is the well head; otherwise, it is zero. N is the total number of pipe elements, j is the neighboring element to I, and $j_n(i)$ is the number of neighboring elements to i (junctions).

The set of flow balance equations of Equation (5) forms a set of N non-linear equations in N unknown pipe potentials (pressures) $\Phi_{w,i}$. Since Equation (5) is non-linear, it is necessary for it to be linearized with respect to the unknowns.

Linearization of Flow Balance Equations

Consider flow from element j into element i. Linearizing the flow rate q with respect to $$\Phi_{W,i}$$

leads to $$q_{j,i}^{v+1} = q_{j,i}^{v} + \frac{\partial q_{j,i}^{v}}{\partial \Phi_{w,i}} \delta \Phi_{w,i} \quad (6)$$

$$= q_{j,i}^{v} + C_1 \left[ \frac{1}{\sqrt{f}} \frac{\partial \sqrt{\Delta \Phi_{j,i}}}{\partial \Phi_{w,i}} + \frac{\partial}{\partial \Phi_{w,i}} \left( \frac{1}{\sqrt{f}} \sqrt{\Delta \Phi_{j,i}} \right) \right] \delta \Phi_{w,i}$$

For illustration purposes, the friction factor f is assumed to be constant.

The second term in Equation (6) goes to zero, which results in:

$$q_{j,i}^{v+1} = q_{j,i}^{v} + \frac{\partial q_{j,i}^{v}}{\partial \Phi_{w,i}} \delta \Phi_{w,i}$$

$$= q_{j,i}^{v} + C_1 \left[ \frac{1}{\sqrt{f}} \frac{\partial \sqrt{\Delta \Phi_{j,i}}}{\partial \Phi_{w,i}} \right] \delta \Phi_{w,i}$$

$$= q_{j,i}^{v} + C_1 \frac{1}{2\sqrt{f}\sqrt{\Delta \Phi_{w,i}}} \delta \Phi_{w,i}$$

using the definition of q in (1)

$$= q_{j,i}^{v} + \frac{q_{j,i}^{v}}{2\Delta \Phi_{w,i}} \delta \Phi_{w,i} \quad (7)$$

$$= q_{j,i}^{v} + c_{j,i} \delta \Phi_{w,i}$$

where $$\Delta \Phi_{w,i} = \Phi_{w,j} - \Phi_{w,i}$$

$$c_{j,i} = \frac{1}{2} \frac{q_{j,i}^{v}}{(\Phi_j - \Phi_i)}$$

Substituting Equation (7) into Equation (5) and rearranging terms, a linear system of equations in terms of unknowns results:

$$\delta \Phi_{w,i}, i = 1, N.$$

Using vector notation for the unknowns:

$$\vec{\Phi}_w^v = (\Phi_{w,1}^v, \ldots, \Phi_{w,N}^v)^T$$

$$J^v \delta \vec{\Phi}_w^v = \vec{b}^v \quad (8)$$

Where $J^v$ is the N×N Jacobian matrix, superscript v is the iteration level, $\delta \vec{\Phi}_w^v$ is the solution increment, and $\vec{b}^v$ is the right hand side, after solving Equation (8) for the unknown vector $\delta \vec{\Phi}_w^v$, the solution is updated:

$$\vec{\Phi}^{v+1} = \vec{\Phi}^v + \delta \vec{\phi}^v \quad (9)$$

until $$\|\vec{b}^v\|_2 \le \epsilon$$

or convergence is achieved.

The elements of $J^v$ and $\vec{b}^v$ are defined below.

Alternative Numerical Solution

The equation set in Equation (5) represents the residuals $r_i$ at the node (segment) i. The Equation set (5) can be written as $$r_i = 0$$

$$i = 1, 2 \ldots N \quad (5a)$$

The residuals could also be expressed in terms of unknown well bore potentials. Equation (5a) can be written as $$r_i(\Phi_{w,1}, \ldots \Phi_{w,N}) = 0. \quad (5b)$$

Rather than solving Equation (5b) a square norm could be used to solve for the same unknowns, i.e., $$r_i^2(\Phi_{w,1}, \ldots \Phi_{w,N}) = 0 \quad (5c)$$

Solution of Equation (5c) would give the same results as Equation (5b). Linearization of Equation (5c) for any variable $$\Phi_{w,i}$$

for the element i, Equation (5c) linearization yields:

$$2r_i \frac{\partial r_i}{\partial \Phi_{w,i}} \delta \Phi_{w,i} = 0 \quad (5d)$$

Equation (5d) practically means that the Jacobian in Equation (4) is multiplied by $2r_i$.

As will be show later, solving Equation (5d) provides faster convergence than Equation (5) for difficult problems.

Pipe Element Numbering Protocol

In accordance with the present invention, a numbering protocol or scheme has been developed to simplify data processing requirements to solve the unknowns for each element or pipe segment.

Figure 3:
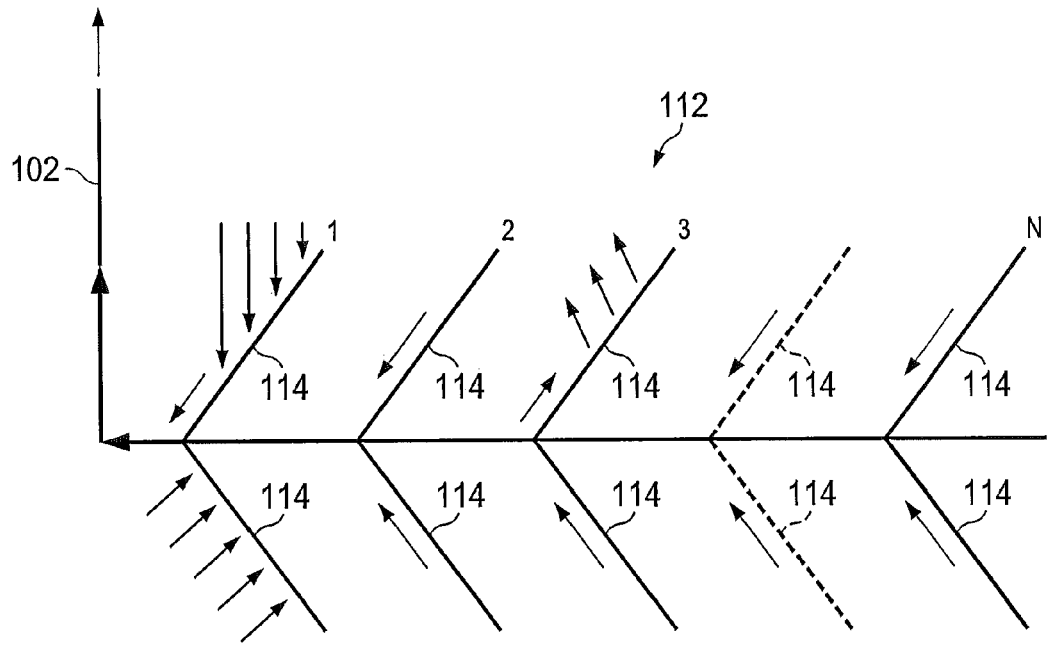
FIG. 3 is a schematic diagram of flow behavior in a multilateral well.

FIG. 3 is an example diagram known as a tree structure illustrating flow behavior for an example MRC well. The well structure can be mapped into a two dimensional (X-Y) array as a well tree structure 125 shown in FIG. 8. It can be assumed that there are Nx number of grids in X direction (i index) and there are Ny grids in Y direction (j index). In the example in FIG. 8, Nx=7, and Ny=3. Assuming a constant grid size, the total number of unknowns for this case is the product of matrix multiplication: Nx*Ny+2*Ny, which is 27.

Figure 8:
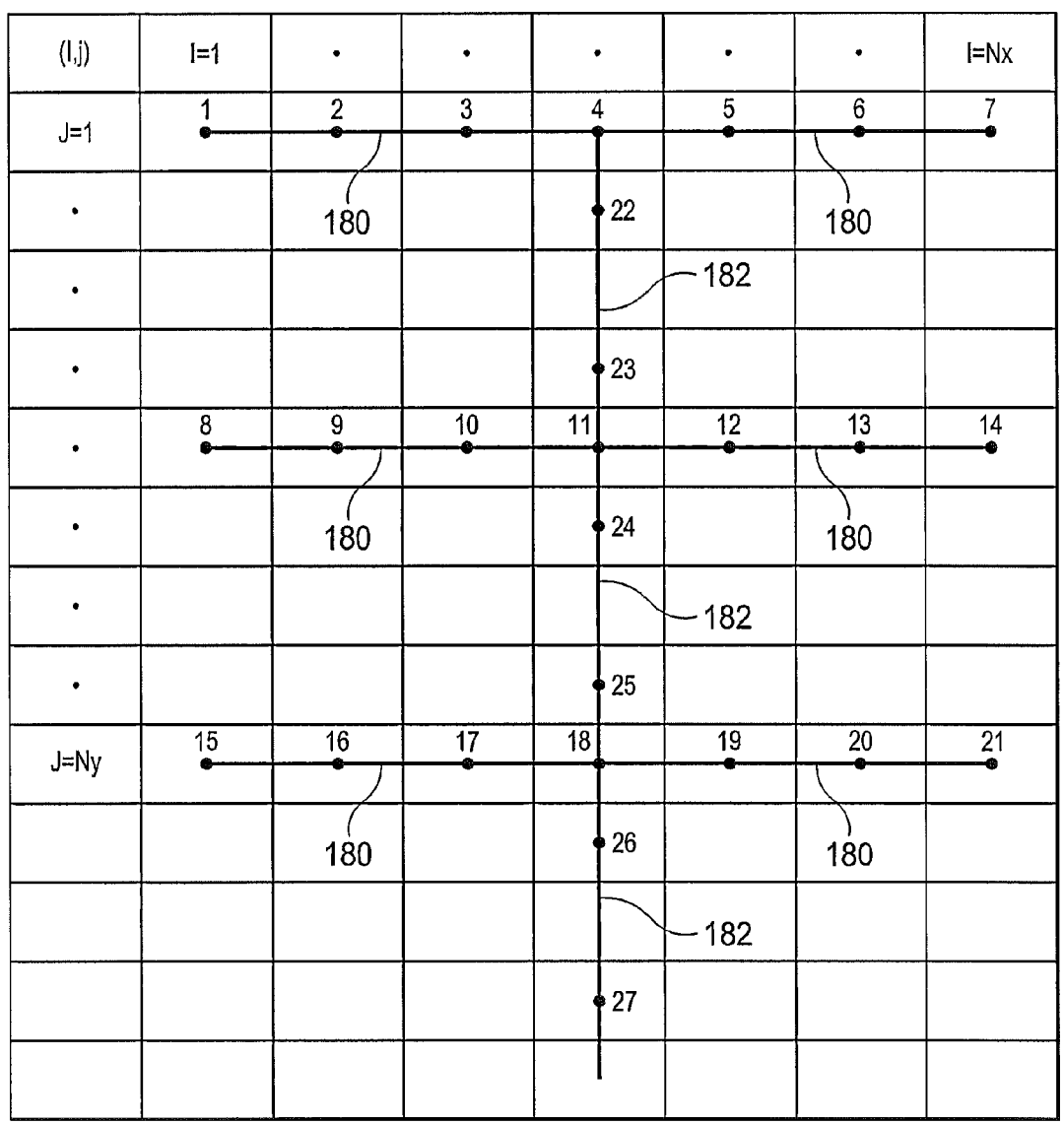
FIG. 8 is a schematic diagram of a numbering protocol or scheme for pipe segments of a multilateral well according to the present invention.
Figure 10:
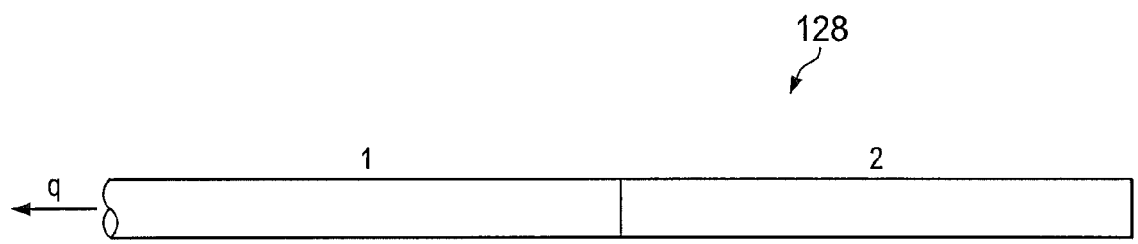
FIG. 10 is a schematic diagram of flow at a well head.

The above numbering illustrated schematically in FIG. 8 results in a predominantly tridiagonal coefficient matrix $J^v$ with unstructured elements for junction elements 4, 11, 18 as shown in FIG. 8.

Figure 9:
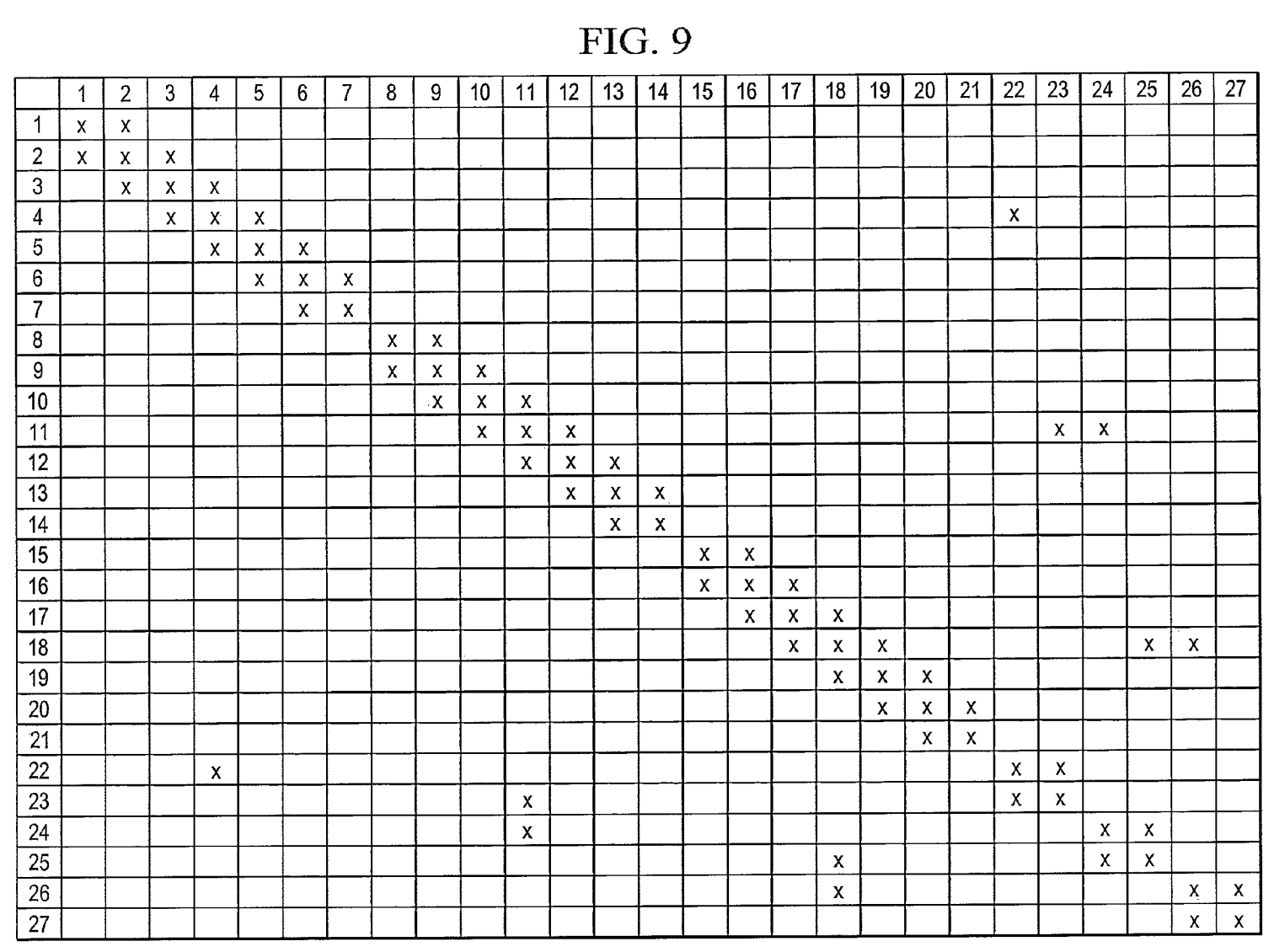

In the matrix of FIG. 9, the sign "x" indicates a non-zero element, while a blank space means "zero". It can be seen that the matrix in FIG. 9 is unstructured. The elements of the coefficient matrix for the various nodes illustrated in FIG. 8 are as follows:

Node 1

$$J_{1,1} = -(c_{2,1} + PI_1)$$

$$J_{1,2} = c_{1,2} \quad (10)$$

Right Hand Side $$b_1 = -q^v_{1,2} - PI_1 \Phi_R \quad (11)$$

Where $$c_{j,i} = \frac{1}{2} \frac{q^v_{j,i}}{(\Phi_j - \Phi_i)} \quad \text{as defined in Equation (7)} \quad (12)$$

For an interior node which has two neighbors, such as node 2 of FIG. 8

$$J_{2,1} = c_{1,2}$$

$$J_{2,2} = -(c_{1,2} + c_{3,2} + PI_2))$$

$$J_{2,3} = c_{3,2}$$

right hand side $$b_2 = -q^v_{1,2} - q^v_{3,2} - PI_2 \Phi_R \quad (13)$$

At any junction such as node 11 of FIG. 8:

$$J_{11,10} = c_{11,10}$$

$$J_{11,11} = -(c_{10,11} + c_{12,11} + c_{23,11} + c_{24,11} + PI_{11})$$

$$J_{11,12} = c_{11,12}$$

$$J_{11,23} = c_{11,23}$$

$$J_{11,24} = c_{11,24}$$

right hand side $$b_{11} = -q^v_{10,11} - q^v_{12,11} - q^v_{23,11} - q^v_{24,11} - PI_{11} \Phi_R \quad (14)$$

At the well (node 27)

$$J_{27,26} = c_{27,26}$$

$$J_{27,27} = -c_{27,27}$$

right hand side $$b_{27} = -q^v_{26,27} + q \quad (15)$$

Structure of the Coefficient Matrix

It is clear that the linear equation system with a coefficient matrix structure shown in FIG. 9 cannot be solved by tridiagonal solvers since it has off diagonal elements. For a well with a larger number of branches, the number of off-tridiagonal elements increases greatly. In general the above matrix of equations with the non-zero right hand side can be solved by Gaussian elimination. For this method, the entire matrix of with non-zero elements can be stored. For an Nx by Ny system, the solution also would require a full matrix with (NxNy×NxNy) elements. For example, for the above example it is required to store 27×27 full matrix.

However, in case of a larger network (such as wells with high discretization (small number of elements) and more branches, i.e., Nx=100, Ny=100) it becomes prohibitively expensive to solve this system by Gaussian elimination for each iteration. Therefore, a new iterative method has been developed with the present invention which requires less storage and computational speed.

Characteristics of the Coefficient Matrix

If the $c_{i,j} \neq 0$ in the coefficient matrix, and because of no zero PI values in the coefficients, the matrix is diagonally dominant. As will be shown in the examples all the eigenvalues are non-zero $\lambda_i \neq 0$, i=1,N. Hence the determinant of the matrix J is non-zero. Therefore, the matrix J is nonsingular and has a unique inverse which implies a unique solution. Thus the nonlinear system has a unique solution.

On the other hand as the examples will show, the matrix is not well conditioned. This is due to the nature of the pipe flow. As will be demonstrated below, the matrix can be nearly ill conditioned for larger pipe dimensions. For a linear system with the coefficient matrix in FIG. 9 it is much more difficult to solve than the linear equations of porous media.

Since the linear system in question does not have well-conditioned matrices many iterative methods will fail to converge. To solve such an ill-conditioned system a good initial estimate of the solution needs to be provided. This method presents a new approach for the initial estimate.

Initial Estimate for Non-Linear Iterations

The flow rate between the two points 2, 1 in a pipe 128 FIG. 2 in the reservoir is given by Equation (16):

$$q_{2,1} = \frac{C_1}{\sqrt{f(q_{2,1})}} \sqrt{\Phi_{w,2} - \Phi_{w,1}} \quad (16)$$

Figure 11:
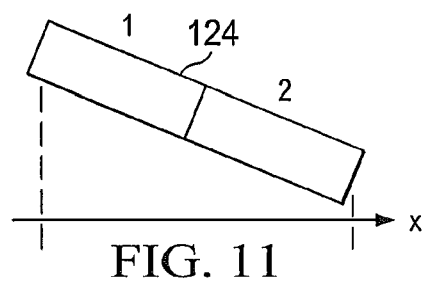
FIG. 11 is a schematic diagram of a segment of a pipe element in a multilateral well.

FIG. 11 illustrates schematically flow $q_{2,1}$ at the well head 124 between segments 1 and 2. Equation 16 can be abbreviated as:

$$q = \frac{C_1}{\sqrt{f}} \Delta \Phi_w = q_{2,1} \tag{17}$$

Since the flow rate is constant and equal to q between point 2 and point 1, Equation (17) can be considered for the purposes of the present invention as equivalent to the flow of fluid through porous media:

$$q = T_p \Delta \Phi_w \tag{18}$$

where $T_p$ is the pipe transmissibility in the units of bbl/day/psi.

Next, equating Equation (18) to Equation (17), it is possible to obtain $$T_p = \frac{C_1}{\sqrt{f}} \tag{19}$$

Next, the transmissibility value $T_p$ is used while treating the system as porous media. It is then possible to solve for the well pressures. This will provide initial estimates which are used to start the non-linear iterations.

Equivalent Porous Media System for Initial Estimates

Since the flow is single phase and steady state, the flow between two elements (i,j) is given by the Darcy's law:

$$q_{i,j} = T_p(\Phi_{w,i} - \Phi_{w,j}) \tag{20}$$

Where $T_p$ is the transmissibility defined as Permeability*Area of Flow/Distance.

If the flow balance is written for each well pipe segment and junction, the governing differential equations for the pipe flow in discrete form are as follows:

$$\Delta_x T_p \Delta \tilde{\Phi}_w + \Delta_y T_p \Delta \tilde{\Phi}_w + PI(i,j)^*(\Phi_R - \tilde{\Phi}_w) - \delta(i,j)q = 0.0 \tag{20a}$$

In Equation (20a) $\tilde{\Phi}_w$ is the approximation to the unknown $\Phi_w$, and $\Delta_x$ is the difference operator $$\frac{\partial}{\partial x}$$

and (i,j) is the grid (element) address in x, and y direction, $\delta(i,j)$ is the Dirac's delta function which is 1 at the well location; otherwise it is zero.

Next, the two dimensional format is converted in one dimensional numbering by using $$k = (j-1)^* Nx + i \tag{20b}$$

which used in forming the Jacobian, as will be set forth below.

Equation (20a) is linear with respect to the unknowns $\tilde{\Phi}_w$. If Equation (20a) is written for each pipe element and one dimensional indexing used in Equation (20b) a set of linear equations is obtained for $\tilde{\Phi}_{w,i}$, i=1,N The linear system is described by Equation (21):

$$J \vec{\Phi}_w = \vec{b} \tag{21}$$

Figure 12:
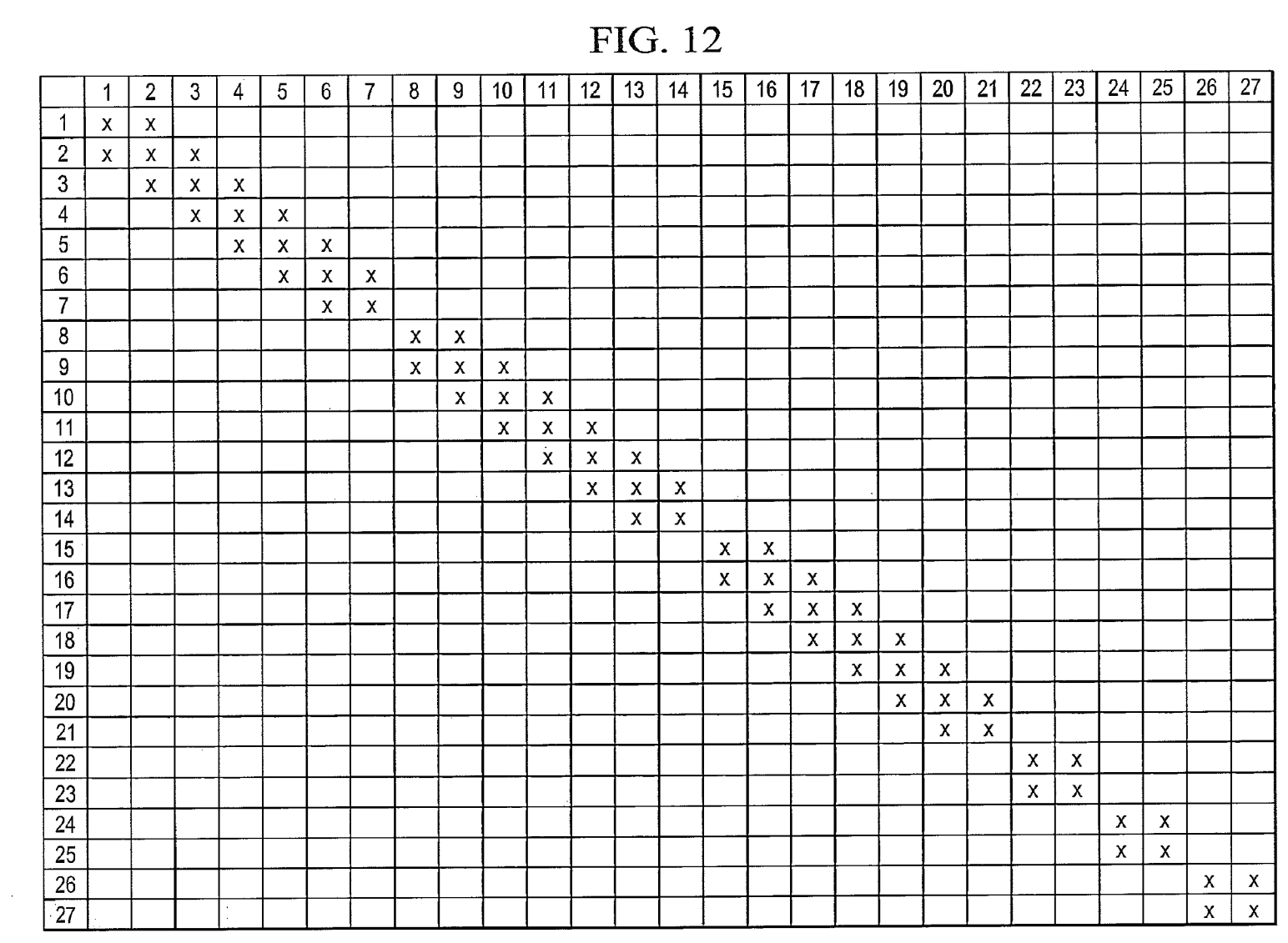

The coefficient matrix J is unstructured as shown in FIG. 12. The elements of the coefficient matrix J are as below:

Node 1:

$$J_{1,1} = -(T_p + PI_1)$$

$$J_{1,2} = T_p \tag{22}$$

Right Hand Side:

$$b_1 = -PI_1 \Phi_R \tag{23}$$

For an interior node which has two neighbors, such as node 2 in FIG. 9:

$$J_{2,1} = T_p$$

$$J_{2,2} = -(T_p + T_p + PI_2)$$

$$J_{2,3} = T_p$$

right hand side $$b_2 = -PI_2 \Phi_R \tag{24}$$

At any junction, such as node 4 in FIG. 9:

$$J_{4,3} = T_p$$

$$J_{4,4} = -(T_p + T_p + T_p + PI_4)$$

$$J_{4,5} = T_p$$

$$J_{4,22} = T_p$$

right hand side $$b_4 = -PI_4 \Phi_R \tag{25}$$

At the well, or node 27 in FIG. 9:

$$J_{27,26} = T_p$$

$$J_{27,27} = -(T_p)$$

right hand side $$b_{27} = +q \tag{26}$$

Therefore the N×N system can be solved according to the present invention by a direct method for small systems or iterative method for large systems for the unknown vector $\vec{\Phi}_w$. The solution of the system provides the initial estimates for the well pressures (potentials) inside the MRC well pipe network.

Linear Solvers

New Iterative Linear Solver

For large number of unknowns an iterative solver is needed. Iterative solvers require less storage and are much faster than the direct solvers using Gaussian elimination. Recalling the linear system in Equation (9) and dropping the superscript and subscript for convenience, Equation (9) can be written as Equation (27) as follows:

$$J \delta \vec{\Phi} = \vec{b} \tag{27}$$

Preconditioning

For the preconditioning matrix, the tridiagonal portion of the coefficient matrix in FIG. 9 is selected. Let M be an approximation to J. Then for the above example, the first three rows of M becomes of the following form:

The ith element (Ith row) of M is as below:

$$J_{i,i-1} = c_{i-1,i}$$

$$J_{i,i} = -(c_{i-1,i} + c_{i+1,i} + PI_i)$$

$$J_{i,i+1} = c_{i+1,i}$$

$$i = 1, 27 \tag{28}$$

The conjugate residual method is then used with Orthomin acceleration as described in *Greenbaum, Iterative Methods for Solving Linear Systems, SIAM Publications in Applied Mathematics*, 1979, pp. 33-41. The conjugate resolution used for example is as set forth below:

Solve for $\delta \vec{\Phi}_0$ $$M \delta \vec{\Phi}_0 = b \tag{29}$$

Let r denote the residual, then $$r_1 = bJ^{-1} \delta \vec{\Phi}_0 \tag{30}$$

$$\delta(\delta \Phi_0) = M^{-1} r_1 \tag{31}$$

Do i=0, ... until convergence $$\alpha_i = \frac{(r_i, J\delta(\delta\Phi_i))}{(J\delta(\delta\Phi_i), J\delta(\delta\Phi_i))} \tag{31a}$$

$$\delta \Phi_{i+1} = \delta \Phi_i + \alpha_i \delta(\delta \Phi_i) \tag{32}$$

$$r_{i+1} = r_i - \alpha_i J \delta(\delta \Phi_i) \tag{33}$$

do $j = j_i, i$ $$c_{i,j} = -\frac{(JM^{-1} r_{i+1}, J\delta(\delta\Phi_i))}{(J\delta(\delta\Phi_i), \delta(\delta\Phi_i))} \tag{34}$$

end do j $$\delta(\delta \Phi_{i+1}) = M^{-1} r_{i+1} + \sum_{j=j_i}^{i} c_{i,j} \delta(\delta \Phi_i) \tag{35}$$

stop if $\|r_{i+1}\| \le \varepsilon$ end do i

In the second loop of the processing:
  $j_i = 0$ for CGR method;=max(0,i−k+1),ORTHOMIN
  k=number of orthogonal directions The solution obtained for $\delta \vec{\Phi}_0$ is substituted into the nonlinear loop in Equation (9) to obtain the unknowns:

$\vec{\Phi}_W$ for the nonlinear system of Equations in Equation set (5) or (5c).

The friction factor in used as input data depends on the flow rate and flow parameters. It is defined in terms of dimensionless Reynolds ($R_e$) number as follows:

$$R_e = \frac{0.123129 \, dq\rho}{\pi r_w^2 \mu}$$

where $r_w$ is the wellbore radius, ft., $\rho$ is the fluid density, lbs/cu ft., and $\mu$ is fluid viscosity, centipoise.

The friction factor used for the examples described below is:

for $R_e \le 2{,}300$. $f = 64/R_e$ for $R_e > 2{,}300$ $f = \{1.14 - 2 \, \text{Log}(\epsilon + 21.25 R_e^{-0.9})\}^{-2.0}$ where $\epsilon$ is the pipe roughness, dimensionless.

Linearization

Considering the flow rate equation and dropping the subscript w for convenience flow from node j to node i is given by:

$$q_{j,i} = \frac{C_1}{\sqrt{f(q_{j,i})}} \sqrt{\Phi_j - \Phi_i} \tag{28}$$

where $$C_1 = \frac{295.5 d^{2.5} E}{\sqrt{\gamma} \sqrt{f(q_{j,i}) \Delta x}} \tag{29a}$$

For the iteration level v, Equation (9) can be expanded into a Taylor series in terms of $\Phi_i$ and $\Phi_j$ as follows:

$$q_{j,i}^{v+1} = q_{j,i}^v + \frac{\partial q_{i,j}^v}{\partial \Phi_i} \delta \Phi_i + \frac{\partial q_{i,j}^v}{\partial \Phi_j} \delta \Phi_j \tag{29b}$$

For illustration, considering the $\Phi_i$ unknown only:

$$\frac{\partial q_{i,j}^v}{\partial \Phi_i} = C_1 \frac{\partial}{\partial \Phi_i} \left[ \frac{1}{\sqrt{f}} \sqrt{\Phi_j - \Phi_i} \right] \tag{29c}$$

$$= C_1 \left[ -\frac{\frac{\partial \sqrt{f}}{\partial \Phi_i}}{f} \sqrt{\Phi_j - \Phi_i} - \frac{1}{2\sqrt{f} \sqrt{\Phi_j - \Phi_i}} \right]$$

If f is constant, then the first term becomes zero. In fact, numerical experiments have shown that the first term is very small and can be assumed zero for varying flow rates q.

$$\frac{\partial q_{j,i}^v}{\partial \Phi_i} = -C_1 \left[ \frac{1}{2\sqrt{f} \sqrt{\Phi_j - \Phi_i}} \right] \tag{29d}$$

Using Equation (29a) results in:

$$\frac{\partial q_{j,i}^v}{\partial \Phi_i} = -\frac{1}{2} \frac{q_{j,i}^v}{(\Phi_j - \Phi_i)} \tag{29e}$$

Substituting Equation (29e) into Equation (29b) results in:

$$q_{j,i}^{v+1} = q_{j,i}^v - \frac{1}{2} \frac{q_{j,i}^v}{(\Phi_j - \Phi_i)} \delta \Phi_i \tag{29f}$$

which can further be abbreviated as:

$$q_{j,i}^{v+1} = q_{j,i}^v + c_{j,i} \delta \Phi_i \tag{29g}$$

where $$c_{j,i} = -\frac{1}{2} \frac{q_{j,i}^v}{(\Phi_j - \Phi_i)} \tag{29h}$$

If the expansion is considered with respect to both unknowns in Equation (29b), the following results:

$$q_{j,i}^{v+1} = q_{j,i}^v + c_{j,i} \delta \Phi + d_{i,j} \delta \Phi_j \tag{29i}$$

where $$d_{j,i} = \frac{1}{2} \frac{q_{j,i}^v}{(\Phi_j - \Phi_i)} \tag{29j}$$

Matrix Definitions

The condition number associated with the linear system of equations Ax=b is an important property of the coefficient matrix, indicating how accurate the solution would be. Assuming that A is a square matrix, the condition number κ is defined as below:

$$\kappa(A) = \|A\| \cdot \|A^{-1}\|$$

Where $\|A\|$ is the matrix norm is computed by the "1 or Infinity" norms defined by $$\|A\|_1 = \max \sum_{i=1}^{n} |a_{ij}|, \ 1 \leq j \leq n$$

$$\|A\|_\infty = \max \sum_{j=1}^{n} |a_{ij}|, \ 1 \leq i \leq n$$

Practically when the Condition number is close to 1, it is easier to find a solution for the linear system with good accuracy. However, for large condition numbers, the system becomes ill-conditioned, which means it will be very difficult to find a solution.

Eigenvalues and Eigen Vectors of a Matrix

If A is a square matrix, a non-zero vector v is an eigenvector of A if there is a scalar λ such that $$Av = \lambda v$$

The scalar λ is said to be the eigenvalue of A corresponding to v. The eigenvalues of A are precisely the solutions λ to the following Equation:

$$\det(A - \lambda I) = 0$$

A general determinant for a matrix A can be computed by:

$$\det(A) = \sum_{i=1}^{k} a_{ij} C_{ij}$$

$$C_{ij} = (-1)^{i+j} M_{ij}$$

Where $M_{ij}$ is the minor of A by eliminating row I and column j.

It can be shown that for an N×N square matrix A $$\det(A) = \prod_{i=1}^{N} \lambda_i = \lambda_1 \ldots \lambda_N$$

The determinant of a matrix is also an indication of its condition. For example if the determinant is close to zero, the matrix A is ill-conditioned, which means it is very difficult to have a solution to the linear system. Conversely, if the determinant is substantially greater than zero, a solution to the linear system is more easy to achieve.

Computer Implemented Process

A flow chart F (FIG. 13) composed of a set of data processing steps illustrates the structure of the logic of the present invention as embodied in computer program software. The flow chart F is a high-level logic flowchart which illustrates a method according to the present invention of processing data for coupled pipe network-reservoir modeling for multi-branch oil wells according to the present invention. It should be understood that the flow charts illustrate the structures of computer program code elements that function according to the present invention. The invention is practiced in its essential embodiment by computer components that use the program code instructions in a form that instructs a digital data processing system D (FIG. 14) to perform a sequence of processing steps corresponding to those shown in the flow chart F. The flow chart F of FIG. 13 contains a preferred sequence of steps of computer implemented processing data for coupled pipe network-reservoir modeling for multi-branch oil wells for users of the data processing system D.

The flow chart F is a high-level logic flowchart illustrates a processing methodology according to the present invention. The method of the present invention performed in a computer C (FIG. 14) of the data processing system D can be implemented utilizing the computer program steps of FIG. 13 stored in memory 150 and executable by system processor 152 of computer C. As will be set forth, the flow chart F illustrates a preferred embodiment of simulation and presentation of reservoir data to users of the data processing system D to perform coupled pipe network-reservoir modeling for multi-branch oil wells The results are used for reservoir simulation and evaluation and related purposes.

During step 130 (FIG. 13) of the flow chart F, input data is loaded in the memory of data processing system D. The input data includes pressure, productivity index and perforation data for wells in a reservoir, as well as data regarding fluid density and fluid viscosity. The input data also includes data regarding pipe dimensions and lengths and the length of pipe segments between perforations and pipe junctions, as well as pipe roughness measures. The input data is then available to be in the data processing system D to form coupled pipe network-reservoir models of multi-branch oil wells in the reservoir.

During step 132, a measure of pipe transmissibility Tp is determined with the pipe regarded as having flow characteristics of porous media, as described above regarding Equation (19) to provide initial estimates for further processing. During step 134, a linear system matrix is then formed as described above regarding Equations (21) through (26) to form an N×N matrix for further processing by the data processing system D.

During step 136, the linear system matrix formed during step 134 is solved for the well potential estimates $\Phi_{w,i}$, i=1, N using the conjugate residual method described above.

During step 138, the Jacobian matrix J is then formed, according to either of two methodologies. One is the methodology described above with regard to Equation (8) through (15), while the other is the methodology described above with regard to Equation (5d).

Next, during step 140, the data processing system D solves the vector flow balance equation matrix for $\delta\Phi_w^\nu = b^\nu$ as described above. During step 142, the processing results of step 140 are tested for convergence as described above. If convergence is determined to not be present during step 142, processing returns to step 138 for another processing iteration.

If convergence is determined to have been achieved during step 142, processing proceeds to step 144 where flow rates $q_{i,j}$ between nodes i, j in the model are determined according to the methodology described above with regard to Equation (16). Perforation rates $q_i$ are also determined during step 144 based on the well potentials and productivity indexes as described in Equation 1aa. During step 144, the flow rates and perforation rates which are determined are then stored for further usage, processing and display purposes.

Data Processing

Figure 14:
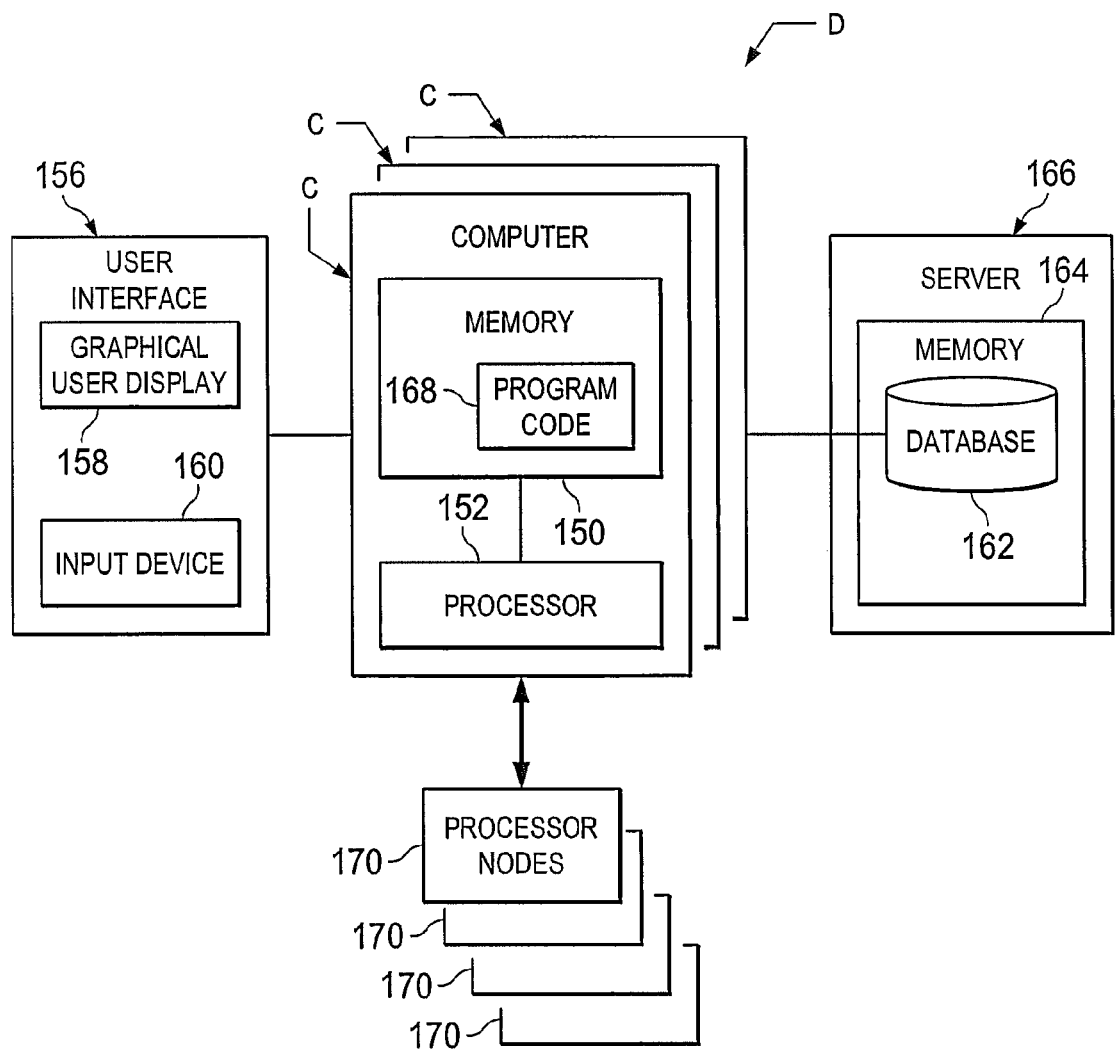
FIG. 14 is a schematic block diagram of a data processing system for coupled pipe network—reservoir modeling for multi-branch oil wells according to the present invention.

As illustrated in FIG. 14, a data processing system D according to the present invention includes a computer C having a processor 152 and memory 150 coupled to the processor 152 to store operating instructions, control information and database records therein. The computer C may, if desired, be a portable digital processor, such as a personal computer in the form of a laptop computer, notebook computer or other suitable programmed or programmable digital data processing apparatus, such as a desktop computer. It should also be understood that the computer 120 may be a multicore processor with nodes such as those from HP, Intel Corporation or Advanced Micro Devices (AMD), or a mainframe computer of any conventional type of suitable processing capacity such as those available from International Business Machines (IBM) of Armonk, N.Y. or other source.

The computer C has a user interface 156 and an output data display 158 for displaying output data or records of lithological facies and reservoir attributes according to the present invention. The output display 158 includes components such as a printer and an output display screen capable of providing printed output information or visible displays in the form of graphs, data sheets, graphical images, data plots and the like as output records or images.

The user interface 156 of computer C also includes a suitable user input device or input/output control unit 160 to provide a user access to control or access information and database records and operate the computer C. Data processing system D further includes a database 162 stored in computer memory, which may be internal memory 150, or an external, networked, or non-networked memory as indicated at 164 in an associated database server 166.

The data processing system D includes program code 168 stored in memory 150 of the computer C. The program code 168, according to the present invention is in the form of computer operable instructions causing the data processor 152 to perform the computer implemented method of the present invention in the manner described above and illustrated in FIG. 13.

It should be noted that program code 168 may be in the form of microcode, programs, routines, or symbolic computer operable languages that provide a specific set of ordered operations that control the functioning of the data processing system D and direct its operation. The instructions of program code 168 may be may be stored in memory 150 of the computer C, or on computer diskette, magnetic tape, conventional hard disk drive, electronic read-only memory, optical storage device, or other appropriate data storage device having a computer usable medium stored thereon. Program code 168 may also be contained on a data storage device such as server 166 as a computer readable medium, as shown.

Figure 13:
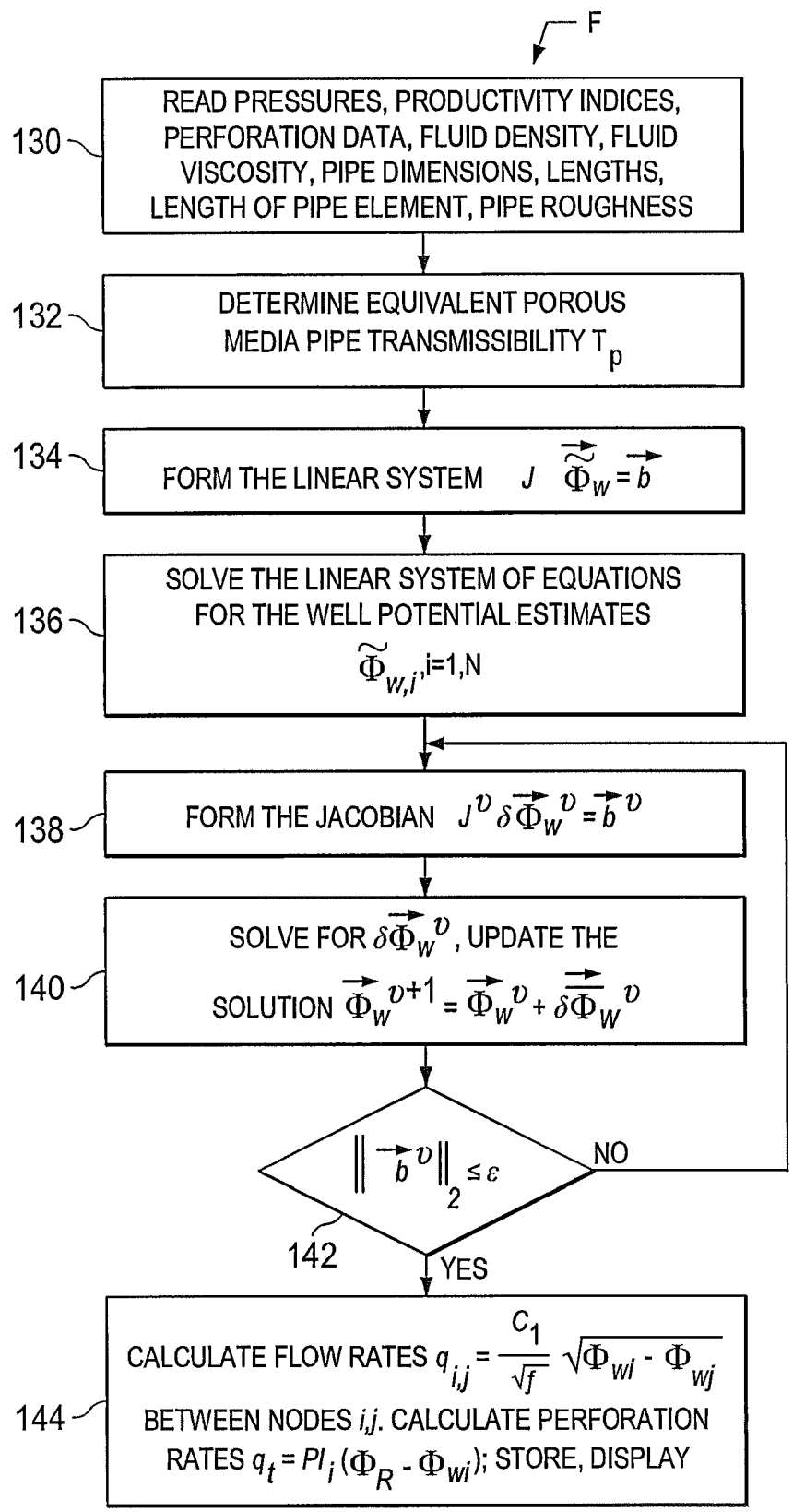
FIG. 13 is a functional block diagram of a set of data processing steps performed in a data processing system for coupled pipe network—reservoir modeling for multi-branch oil wells according to the present invention.

It should also be understood that as indicated schematically in FIG. 13, that the data processing system D may have several computers C functioning as main processor nodes and distributing data for processing to a number of associated processor nodes 170.

Example

Figure 15:
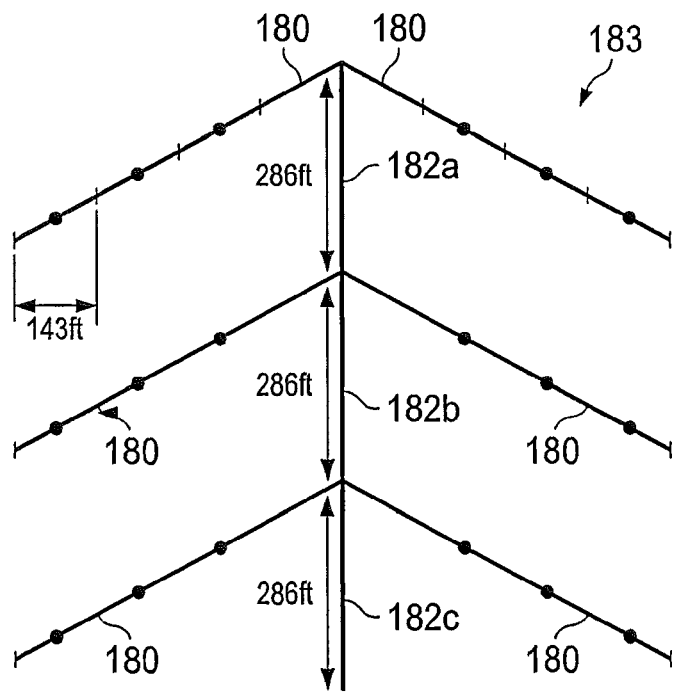
FIG. 15 is a schematic diagram of a multilateral well.

As an example, with regard to the well tree 125 of FIG. 8, as illustrated in FIG. 15, each branch 180 is assumed to be 500 ft. long and each of three mother bores 182 are assumed to be 286 ft. long. The pipe domain is divided into equal segments 143 ft. long. Table I below provides the input parameters for reservoir, fluid and pipe data.

Figure 16:
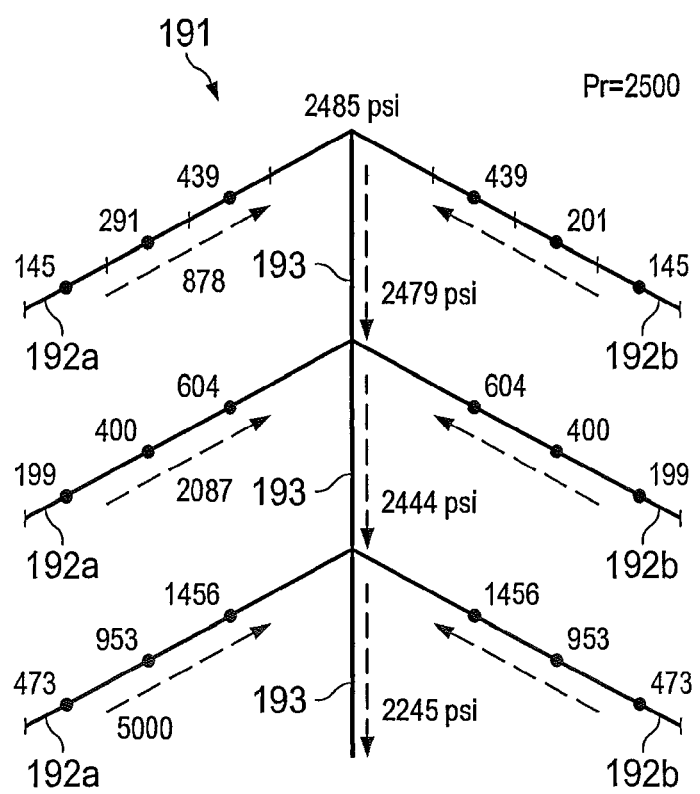
FIG. 16 is a schematic diagram of another multilateral well.
Figure 17:
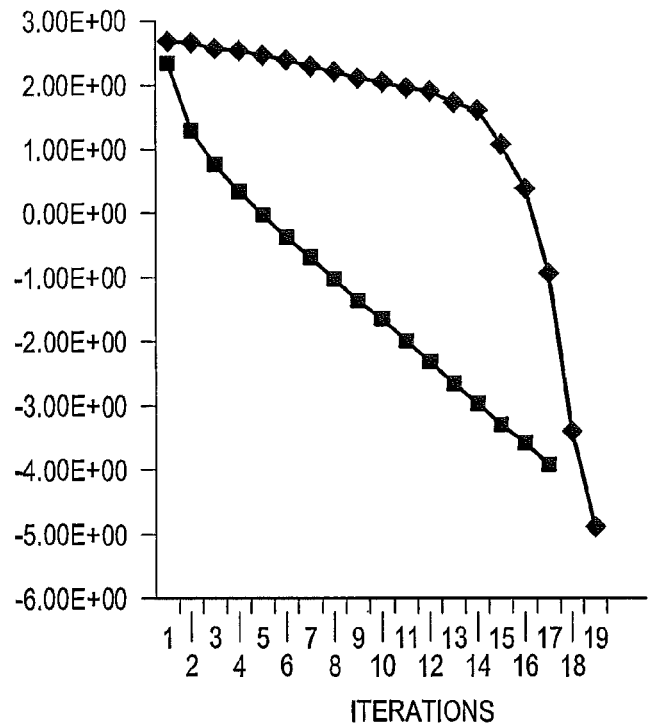
FIG. 17 is a plot of Newton Pressure error per step for a succession of processing iterations according to the present invention.

Using the processing methodology of FIG. 13 described above, pressure distribution at the pipe network of well tree 125 and the flow rates are determined and displayed in FIG. 16. The Newton Pressure step length per iteration step was also determined and is illustrated in FIG. 17. The perforation rates were also determined. The first mother bore 182$a$ illustrated in FIG. 15 was determined to have a production rate of 878 b/d (FIG. 16), the second mother bore 182$b$ a production rate of 2087 b/d and the final mother bore 182$c$ to have the total specified well production rate of 5,000 b/d. FIG. 16 also shows the contribution of each pipe segment and branch. For this example, the least contribution comes from the pipe segments furthest away from the beginning of the well, or well hip 183, which was 145b/d. The branches 180 only contribute 439 b/d each. As the branches get closer to the well hip 183 their contributions increase. For example, the second row of branches contribute 604 b/d each, and the third row of branches closest to the hip 183, contributes the most: 1456b/d for each branch.

Coupled Non Linear Solution Performance

Using the methodology of the present invention, an equivalent porous media transmissibility $T_p$=75.7 b/d/psi (Equation 19) was determined.

This transmissibility value was used in solving a linear porous media system Equations 20a and 21. Estimates for the pressure and flow rate distribution within the well were obtained. Next, these estimates were used for the Non Linear system of Equation (9) to solve for the true pressure and rate distribution.

Figure 18:
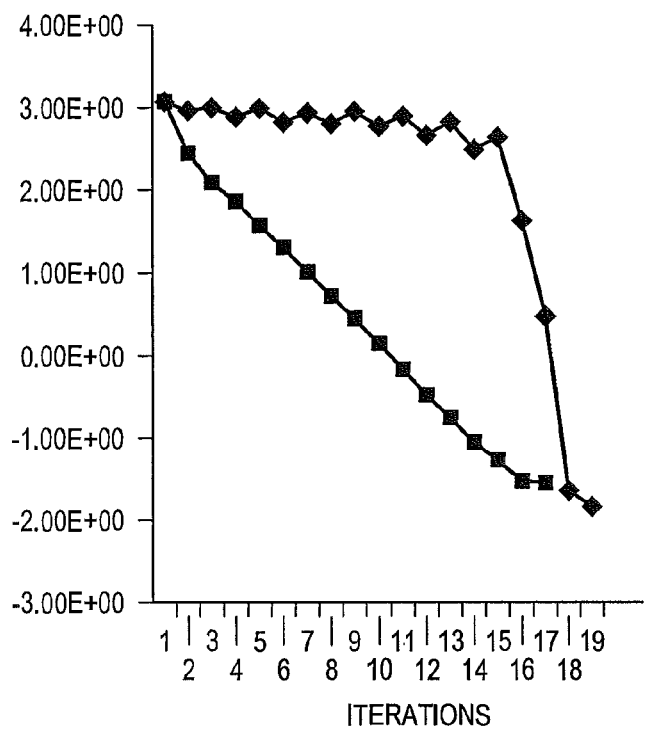
FIG. 18 is a plot of Residual rate error per step for a succession of processing iterations according to the present invention.

FIGS. 17 and 18 demonstrate the convergence of Newton iterations for the pressure solution and rate solution for this example. As can be seen, convergence has been achieved within 19 iterations. The average pressure error has been reduced to 1.246 E-5 psi and residual (rate error) defined by Equations 5 and 5b has been reduced to 0.0122 b/d, both of which are very small errors. However, an order of magnitude reduction in error is seen until the iterations exceed 14. Beyond this iteration, convergence is very rapid.

Non Linear Solution with Error Square Norm

Rather than solving Res=0 (Equation 6), if the solution is for Res$^2$=0 (Equation 5c) the same result is still obtained. However, convergence is more steep. FIG. 17 shows that pressure error is reduced nearly 1 psi in 5 iterations, as opposed to 15 iterations in case solving for Res=0.

Similarly residual errors (b/d) become 1b/d (out of 5,000 b/d) in 9 iterations, as opposed to 17 iterations. Clearly, solving for Res$^2$=0 has better convergence properties than solving the Res=0 system.

Analysis of Convergence

Table 2 below summarizes the properties of the linear systems together with convergence results for the five cases studied and described in further detail below. The results for five test cases are presented in Table 2.

Case 1

Case 1 is used as a reference to present the coefficient matrix properties. It is not used to solve the entire problem.

The pipe is assumed to be filled with porous media (sand) with 1,000Md and the only Darcy's law (Equation 18) holds. In Case 1, the pipe is treated as porous media. As shown in the first column of the Table 2, the transmissibility in (17) is very small, i.e 1.55e-3 b/d/psi. The Coefficient matrix is well conditioned with Condition Number, as defined above, is 52.8.

In Table 2, the Maximum, minimum eigenvalues of the coefficient matrix and determinant are given, as defined above. It can be seen that the eigenvalues (Columns 6 & 7 of Table 2) are positive.

Since the equations are linear, it was not necessary to do any iteration, and pressure distribution in the well is calculated in one step. But these pressures are not the same if the pipe is treated as a pipe as will be seen below. Again, this example forms a basis of comparison in terms of coefficient matrix properties to compare with the coefficient matrices resulting from the pipe flow.

Case 2

Case 2 is an actual pipe flow problem using the methodology illustrated in FIG. 13. The second row of Table 2 shows the results obtained from the pipe flow calculations. First, an equivalent pipe transmissibility was determined using Equation (20) and found to be 75.7 as opposed to the porous medium (fractured rock) transmissibility, 1.55e-3 which is about 53,000 larger.

The pipe transmissibility value of 75.7 was used to determine an initial estimate of the pressure distribution for the non-linear Newton iterations (Equation 8). It can be seen that the condition number of the coefficient matrix (Column 7 in Table 2) for Case 2 resulting from the linearization is much worse than the porous media equivalent, i.e., 390.79 as opposed to 52.8.

The determinant of the coefficient matrix came much closer to zero, indicating a highly ill-conditioned system, i.e., 5.44e-13 versus 8.19e-2. Eigen values are no longer positive: 18 of them are negative and 9 of them are positive. Case 2 took 19 iterations to converge to specified pressure tolerance of 1.e-4 psi.

Case 3

Case 3 assumes that initial pressure estimates are determined assuming pipe flow replaced by a porous system with an approximate fracture transmissibility estimate of 1.55e-3 b/d/psi. No pipe flow equivalent transmissibility is calculated. After determining the initial estimates, non-linear pipe flow determinations are performed as described above.

It can be seen from Table 2 Case 3 that due to the nature of the pipe flow and a bad initial estimate, the coefficient matrix formed for the Jacobian has a worse condition number than Case 2. Also, the determinant is much closer to zero: 4.e-17 for Case 3 versus 5.44e-13 in Case 2. Eigen values show more spread with a minimum of −0.015. Such a system is highly ill-conditioned and iterations diverged. No solution was obtained.

Case 4

In Case 4, an estimate of Initial pressure distribution was set to reservoir pressure. In this case, since there was no flow from the reservoir into the well bore, the coefficient matrix had many zero elements. Iterations could not start properly and iterations finally diverged.

Case 5

In Case 5, an estimate of the Initial pressure distribution was generated by adding some random variation using a random number generator (noise added to between 0 and 1). In this case, the non-linear system converged. Pressure error was reduced to less than 1 psi in 3 iterations and converged to 4.5 e-5 psi error in 15 iterations. However, this case will not always converge for more difficult problems. For example, when the pipe diameter was increased to 1 ft., this method did not converge even though the res$^2$=0 solution (Equation 5c) was used.

Larger Pipe Diameters

Figure 19:
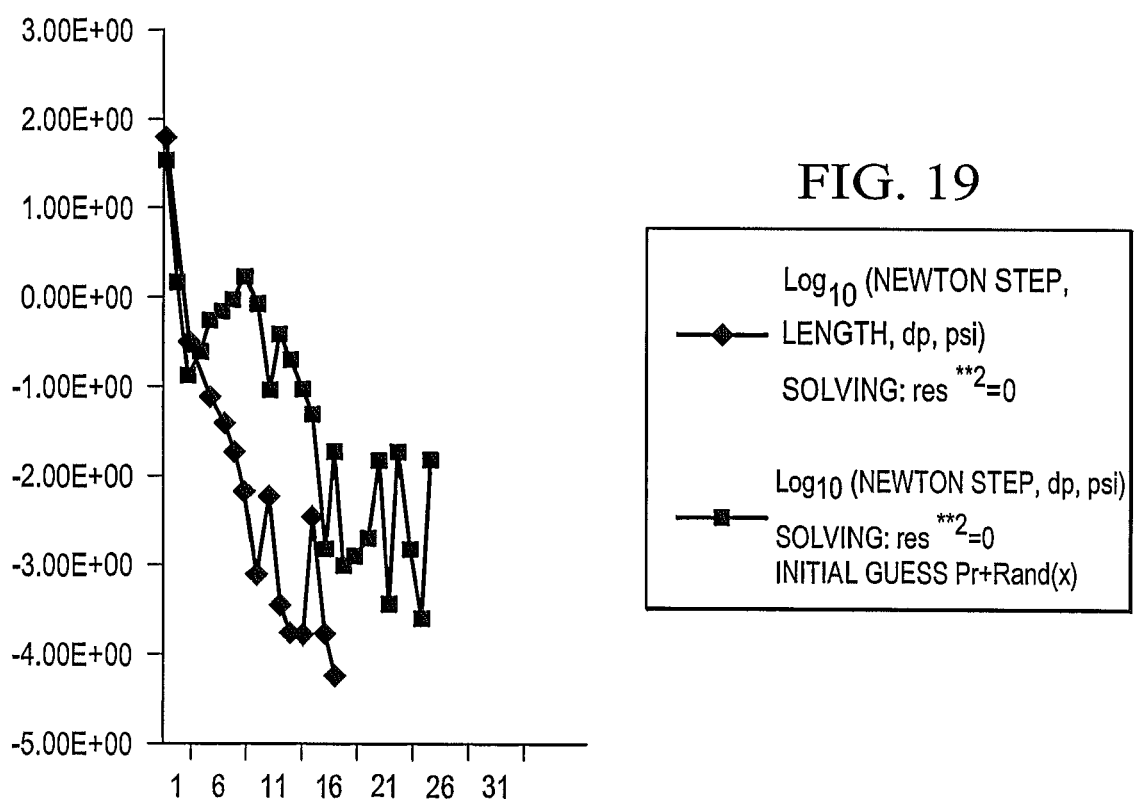
FIG. 19 is a plot of Pressure error per step for a succession of processing iterations according to the present invention.

It was then assumed that the pipe diameter is doubled from the first example to 1 ft. for the entire well. Also, the calibration factor was increased to 0.1 from 0.05. FIG. 19 shows the convergence behavior of the processing methodology and compares it with an initial estimate equal to reservoir potential disturbed with random noise between 0 and 1 for the initial condition.

FIG. 19 shows that the residual equations are solved alone (not squared), as indicated at, iterations converge to 1 psi error in 2 iterations. However, during further iterations the residuals increase again and at twenty six iterations the psi error is reduced to the 0.01 psi range.

On the other hand, if the residual square norm is used, the errors are reduced monotonically and much faster than indicated for the residual equations being solved alone. The Error square has been reduced to 0.0001 psi in only sixteen iterations.

Larger Dimensional (N) Problems

The example cases described above with regard to FIG. 15 used a problem with N=27 unknowns. For this size of problem, linear equations can be solved by a direct method or alternatively the iterative solver. For this type of problem with a small number of unknowns, an iterative solver does not offer any significant speed advantage. However, if the number of unknowns exceeds several hundreds, or thousands, the direct method (Gaussian elimination) requires a significant amount of storage and would run much slower. This is especially the case if the present invention is utilized as an imbedded portion of a reservoir simulator, and if the reservoir requires dealing with several wells. In these cases, the direct method becomes impractical for larger dimensional problems.

For such large problems as a practical matter an iterative solver must be used. The iterative solver requires little data memory storage and is fast. Several examples based on a model shown in FIG. 16 are given below which compare the direct solver and the new iterative solver described above. As can be seen the model of FIG. 16 has larger dimensions in terms of unknowns than the model of FIG. 15.

First, a multi-lateral (maximum reservoir contact) well 191 is present with four laterals or wings 192 each with a length of 3000 ft. A left branch 192*a* of each lateral is 1500 ft. long, and a right branch 192*b* is 1500 ft. long. A mother bore 193 between each wing 192 is 100 ft. long, and the well bore diameter is 0.5 ft. The processing of this model described below was done for the horizontal section only.

The well is assumed to produce 5,000 barrel per day. Reservoir pressure is the same as in the previous example (2500 psi). The well pipe is divided into equal 50 ft. segments. All other parameters stay the same as in the example illustrated in FIG. 15. The total numbers of unknowns however is in this example 260.

Using the direct solver methodology, well bottom hole pressure at the beginning of the well was determined to be 2415.367 psi. Using the iterative solver methodology, well bottom hole pressure was determined to be 2415.362 psi. The flow rates in the mother bores 193 were calculated as 385.4 b/d, 922 b/d, 2047b/d and 5,000 b/d using the direct solver.

Using the iterative solver methodology, the flow rates for the same locations in the well were determined to be 387.1 b/d, 918.4 b/d, 2047 b/d, and 5,000 b/d, respectively. The direct solver took 4.4 seconds in simulation time, while the iterative method took only 0.156 seconds. For these calculations residuals were used rather than the square norm.

Results of processing based on the model of FIG. 16 are summarized in Table 3 below. It should be noted that each problem was prepared for element sizes. In Table 3, the first three columns show the dimensions of the system. Column 4 of Table 3 displays the well pressure calculated at the beginning of the well (bottom hole). The last two columns of Table 33 show total simulation time in seconds. As shown in Table 3, both solvers yielded the same bottom-hole pressure.

However, beyond 100 unknowns, it has been found that the direct solver methodology becomes impractical. The reason is that if there are more wells, the cost of the simulation increases drastically when using the direct solver methodology. For fine discretization, with smaller segment lengths and more branches, the direct solver as a practical matter becomes unsuitable for a real reservoir simulator with many wells, i.e., hundreds of wells.

On the other hand, the iterative linear solver methodology described above offers very attractive computational times in the order of few seconds. Therefore, the iterative linear solver can be imbedded in a real reservoir simulator together with the other processing methodology described above to handle hundreds or thousands of wells for non-parallel simulators.

TABLE 1

Properties

| | |
|---|---|
| Reservoir Pressure | 2500 psi |
| Oil Viscosity | 1.0 Cp |
| Pipe Diameter | 0.50 ft. |
| Depth of well | 5,000 ft. |
| Perforation PI | 10 B/D/psi |
| Oil Density | 50 lbs/cu ft |
| Pipe Roughness | 0.01 |
| Pipe Calibration Parameter | 0.05 |

TABLE 2

N = 27, solving res = 0.

| Case | Initial Estimate Tp, b/d/psi | System | Condition No | Determinant | Min Eigen Val | Max Eigen Val | Converged Iteration |
|---|---|---|---|---|---|---|---|
| 1 | 1.55e−3 | Linear Eqns Porous Media | 52.8 | 8.19E−002 | 0.167E+00 | 0.183E+01 | 1 (Used for Initial generating network Pressure Estimates) |
| 2 | 75.7 | Pipe Flow | 390.79 | 5.44E−13 | −0.04 (18 negative Eigen Values) | 27. 9 ev > 0 | 19 |
| 3 | 1.55e−3 | Pipe Flow | 10222. | 4.e−17 | −0.015 16 ev < 0.0 | 27 11 ev > 0 | Diverged |
| 4 | Pinit = Pr | Pipe Flow | 0. | 0 | — | — | Diverged |
| 5 | Pinit = Pr + rand(x) | Pipe Flow | 1,635 | 1.457e−13 | −0.03 18e v < 0 | 27 9 ev > 0 | 20 |

TABLE 3

Total Simulation Time Comparison using Direct and Iterative Solvers

| | | | Calculated well pressure, psi | | Direct Solver, Sec | Iterative Solver, Sec |
|---|---|---|---|---|---|---|
| Nx | Ny | N | Direct | Iterative | | |
| 7 | 3 | 27 | 977.8 | 977.8 | 0.0403 | 0.027 |
| 63 | 4 | 260 | 2415.3 | 2415.3 | 3.32 | 0.23 |
| 126 | 8 | 520 | 624.7 | 624.7 | 11.72 | 0.52 |
| 252 | 5 | 1285 | 717.8 | 717.7 | 262. | 1.14 |

Accordingly, it can be seen that the present invention identifies the proper boundary conditions required for unique solution of coupled reservoir pipe flow problem. A new numbering system to number the pipe segments is provided so that resulting matrices become very close to tridiagonal, although the problem is two dimensional (x-y).

The present invention provides a reservoir modeling method which forms an equivalent porous media system with properties computed from the pipe flow. The equivalent porous media system is solved for an initial estimate of the unknown pressures, which represent variations inside the pipe to fluid influx from the reservoir, and due to production at the wellhead. The non-linear equations which express well pressure and flow rate relationships are linearized by using conveniently derived rate formula from the Bernoulli's equation.

As has been discussed, linear system properties, i.e., eigen values, condition number, and determinant are examined for several problems to analyze the convergence of the non-linear iterations. The methodology of the present invention introduces residual square norm for better convergence of the solution.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present inven-

What is claimed is:

1. A computer implemented method of forming a model of fluid flow rates of a multilateral well in which fluid from a subsurface reservoir enters perforations in a plurality of pipes off a main bore of the well, the model being based on data measurements regarding the fluid, well and reservoir, and comprising the computer implemented steps of:
   determining an initial measure of transmissibility of the pipes based on the data measurements and on the pipes having fluid flow characteristics of a porous media;
   forming a linear model of postulated well potentials at perforations in the pipes based on the initial measure of transmissibility;
   determining a measure of well potential at the perforations in the pipes by computer processing to solve the linear model;
   testing the determined measures of well potential at the perforations in the pipes for satisfactory convergence within a specified limit of accuracy; and
   if convergence is not achieved, adjusting the postulated well potentials of the linear model, and repeating the steps of determining and testing measures of well potential;
   or, if convergence is achieved, determining flow rates for the pipes of the multilateral well based on the determined measures of well potential at the perforations in the pipes.

2. The computer implemented method of claim 1, further including a step of determining flow rates along the pipes of the multilateral well based on the determined measure of well potential.

3. The computer implemented method of claim 1, further including a step of determining perforation rates of flow from the reservoir into the pipes at the perforations in the pipes of the multilateral well.

4. The computer implemented method of claim 1, wherein the step of determining a measure of well potential comprises a step of solving the linear model by Gaussian elimination computer processing.

5. The computer implemented method of claim 1, wherein the step of determining a measure of well potential comprises a step of solving the linear model by iterative solver computer processing.

6. A data processing system forming a model of fluid flow rates of a multilateral well in which fluid from a subsurface reservoir enters perforations in a plurality of pipes off a main bore of the well, the model being based on data measurements regarding the fluid, well and reservoir, the data processing system comprising:
   a processor performing the steps of:
      determining an initial measure of transmissibility of the pipes based on the data measurements and on the pipes having fluid flow characteristics of a porous media;
      forming a linear model of postulated well potentials at perforations in the pipes based on the initial measure of transmissibility;
      determining a measure of well potential at the perforations in the pipes by computer processing to solve the linear model;
      testing the determined measures of well potential at the perforations in the pipes for satisfactory convergence within a specified limit of accuracy; and
      if convergence is not achieved, adjusting the postulated well potentials of the linear model, and repeating the steps of determining and testing measures of well potential;
      or, if convergence is achieved, determining flow rates for the pipes of the multilateral well based on the determined measures of well potential at the perforations in the pipes; and
   a memory forming a record of the determined flow rates for the pipes of the multilateral well.

7. The data processing system of claim 6, further including the processor performing a step of determining flow rates along the pipes of the multilateral well based on the determined measure of well potential.

8. The data processing system of claim 6, further including the processor performing a step of determining perforation rates of flow from the reservoir into the pipes at the perforations in the pipes of the multilateral well.

9. The data processing system of claim 6, wherein the processor, in performing the step of determining a measure of well potential performs a step of solving the linear model by Gaussian elimination computer processing.

10. The data processing system of claim 6, wherein the processor, in performing the step of determining a measure of well potential performs a step of solving the linear model by iterative solver computer processing.

11. A data storage device having stored in a non-transitory computer readable medium computer operable instructions for causing a data processor to form a model of fluid flow rates of a multilateral well in which fluid from a subsurface reservoir enters perforations in a plurality of pipes off a main bore of the well, the model being based on data measurements regarding the fluid, well and reservoir, to perform the following steps:
   determining an initial measure of transmissibility of the pipes based on the data measurements and on the pipes having fluid flow characteristics of a porous media;
   forming a linear model of postulated well potentials at perforations in the pipes based on the initial measure of transmissibility;
   determining a measure of well potential at the perforations in the pipes by computer processing to solve the linear model;
   testing the determined measures of well potential at the perforations in the pipes for satisfactory convergence within a specified limit of accuracy; and
   if convergence is not achieved, adjusting the postulated well potentials of the linear models, and repeating the steps of determining and testing measures of well potential;
   or, if convergence is achieved, determining flow rates for the pipes of the multilateral well based on the determined measures of well potential at the perforations in the pipes.

12. The data storage device of claim 11, further including the instructions comprising instructions for a step of determining flow rates along the pipes of the multilateral well based on the determined measure of well potential.

13. The data storage device of claim 11, further including the instructions comprising instructions for a step of determining perforation rates of flow from the reservoir into the pipes at the perforations in the pipes of the multilateral well.

14. The data storage device of claim 11, wherein the instructions for determining a measure of well potential at the perforations in the pipes by computer processing to solve the linear model comprise instructions for solving the linear model by Gaussian elimination computer processing.

15. The data storage device of claim 11, wherein the instructions for determining a measure of well potential at the perforations in the pipes by computer processing to solve the linear model comprise instructions for solving the linear model by iterative solver computer processing.

\* \* \* \* \*

UNITED STATES PATENT AND TRADEMARK OFFICE
CERTIFICATE OF CORRECTION

PATENT NO. : 9,104,585 B2  Page 1 of 1
APPLICATION NO. : 13/682896
DATED : August 11, 2015
INVENTOR(S) : Ali Haydar Dogru It is certified that error appears in the above-identified patent and that said Letters Patent is hereby corrected as shown below:

In the claims,
In Column 25, Line 11, Claim 1, the word appears as "reservoir," and should read --reservoir--.

Signed and Sealed this
Twenty-second Day of December, 2015

Michelle K. Lee
*Director of the United States Patent and Trademark Office*